United States Patent [19]

Saha

[11] Patent Number: 4,730,344
[45] Date of Patent: Mar. 8, 1988

[54] QUADRATURE-QUADRATURE PHASE SHIFT KEYING WITH CONSTANT ENVELOPE

[75] Inventor: Debabrata Saha, Ann Arbor, Mich.

[73] Assignee: The University of Michigan, Ann Arbor, Mich.

[21] Appl. No.: 28,179

[22] Filed: Mar. 19, 1987

Related U.S. Application Data

[63] Continuation-in-part of Ser. No. 640,057, Aug. 13, 1984, Pat. No. 4,680,777.

[51] Int. Cl.[4] ............... H04L 27/10; H04J 11/00; H03C 3/00
[52] U.S. Cl. ............................. 375/53; 375/67; 375/86; 370/20; 332/23 R
[58] Field of Search ............... 375/53, 54, 60, 67, 375/86, 102, 122; 332/9 R, 110, 22, 23 A, 23 R; 329/124, 125; 370/11, 20, 21, 118; 381/31, 33

[56] References Cited

U.S. PATENT DOCUMENTS

| | | | |
|---|---|---|---|
| 3,204,034 | 8/1965 | Ballard et al. | 370/21 |
| 3,204,035 | 8/1965 | Ballard et al. | 370/21 |
| 3,517,131 | 6/1970 | Becker | 375/38 |
| 3,622,885 | 11/1971 | Kruszynski et al. | 375/38 |
| 3,697,682 | 10/1972 | Berg | 370/118 |
| 4,267,591 | 5/1981 | Wissel et al. | 370/11 |
| 4,338,579 | 7/1982 | Rhodes | 332/22 |
| 4,384,357 | 5/1983 | De Buda et al. | 329/124 |
| 4,406,009 | 9/1983 | Lender | 375/43 |

OTHER PUBLICATIONS

"Carriers," *Data Communications Dictionary;* Sippl; van Norstrand Reinhold Company; 1976.

*Primary Examiner*—Robert L. Griffin
*Assistant Examiner*—Andrew J. Telesz, Jr.
*Attorney, Agent, or Firm*—Rohm & Monsanto

[57] ABSTRACT

Methods for modulating and demodulating digital data streams utilize a quadrature-quadrature phase shift keying data transmission arrangement to acheive a 100% increase in the bandwidth efficiency over known systems, such as minimum shift keying. Known arrangements utilize two dimensional data transmission. However, Q$^2$PSK, in accordance with the invention, provides four dimensional transmission which doubles the rate of data transmission for a given bandwidth, at the expense of approximately 45% increase in the average energy per bit. The input data stream is demultiplexed to form four demultiplexed data streams which are formed of demultiplexed data bits, each such stream being coded to form a stream of data words formed of a predetermined number of data pulses and a parity check bit. Each such data stream is combined with a signal having carrier and data pulse-shaping components. Additionally, the data pulse-shaping components have a quadrature phase relationship with each other, thereby adding the additional two dimensions of data transmission capacity within a constant envelope.

2 Claims, 28 Drawing Figures

STAGGERING OF DATA PULSES IN OQPSK

STAGGERING OF DATA PULSES IN MSK

QUADRATURE-QUADRATURE PHASE SHIFT KEYING WITH CONSTANT ENVELOPE

This is a continuation-in-part, of application Ser. No. 640,057 filed Aug. 13, 1984, now U.S. Pat. No. 4,680,777.

BACKGROUND OF THE INVENTION

This invention relates generally to transmission and modulation systems for digital data, and more particularly, to a digital data modulation system wherein bandwidth efficiency and the data transmission rate are improved by demultiplexing the digital data into a plurality of data channels, wherein the data pulses are shaped by signals having preselected characterizing functions, illustratively sinusoidal and cosinusoidal functions, which have a quadrature phase relationship, and wherein the transmitted signal has a constant envelope.

Spectral congestion due to ever increasing demand for digital transmission calls for spectrally efficient modulation schemes. Spectrally efficient modulation can be loosely said to be the use of power to save bandwidth, much as coding may be said to be the use of bandwidth to save power. In other words the primary objective of a spectrally efficient modulation scheme is to maximize the bandwidth efficiency (b), defined as the ratio of data rate ($R_b$) to channel bandwidth (W). Since a signal can not be both strictly duration-limited and strictly band-limited, there are two approaches in designing a spectrally efficient data transmission scheme. One is the band-limiting approach; the other is the time-limiting approach. In the former, a strictly bandlimited spectral shape is carefully chosen for the data pulse so as to satisfy the Nyquist criterion of zero intersymbol interference (ISI). In the latter, the data pulse is designed to have a short duration and the definition of bandwidth is somewhat relative depending on the situation involved. The latter approach is followed herein.

Like bandwidth, power is also a costly resource in radio transmission. So another objective in designing a high rate data transmission scheme is to reduce the average energy per bit ($E_b$) for achieving a specified bit error rate (BER). The bit error rate performance of two schemes are usually compared under the assumption of an ideal channel corrupted only by additive white Gaussian noise (AWGN). Suppose the two sided power spectral density of noise is $N_0/2$. Then a standard parameter for comparing two modulation schemes is the energy efficiency (e); it is the ratio $E_b/N_0$ required to achieve a BER of $10^{-5}$.

The energy efficiency mostly depends on the signal space geometry. The bandwidth efficiency depends on two factors; firstly the basic waveforms of the data shaping pulses and secondly the utilization of all possible signal dimensions available within the given transmission bandwidth. In data communication, the notion of increasing the rate of transmission by increasing the number of dimensions became prominent when people switched from binary phase shift keying (BPSK) to quadrature phase shift keying (QPSK). Modulation studies during the last fifteen years proposed several modifications of QPSK. Of these, offset quadrature phase shift keying (OQPSK) and minimum shift keying (MSK) have gained popularity because of their several attributes. So any new spectrally efficient scheme ought to be tested in the light of the spectral efficiencies of these two.

BPSK is an antipodal signalling scheme; it uses two opposite phases (0° and 180°) of the carrier to transmit binary +1 and −1. Thus BPSK signal space geometry is one dimensional. QPSK, on the other hand, can be considered as two BPSK systems in parallel; one with a sine carrier, the other with a cosine carrier of the same frequency. QPSK signal space is thus two dimensional. This increase in dimension without altering the transmission bandwidth increases the bandwidth efficiency by a factor of two. Spectral compactness is further enhanced in MSK by using a cosinusoidal data shaping pulse instead of the rectangular one of QPSK. Though MSK and QPSK use different data shaping pulses, their signal space geometries are the same. Both of them use a set of four biorthogonal signals. So the spectral compactness achieved in MSK over QPSK should be distinguished from the compactness achieved in QPSK over BPSK. In the former compactness comes from the shaping of the data pulse, while in the later it comes from increasing the dimension within the given transmission bandwidth.

To see the possibility of any further increase in dimension without increasing the transmission bandwidth substantially, one has to look into the time-bandwidth product. It is a mathematical truth that the space of signals essentially limited in time to an interval $\tau$ and in one sided bandwidth occupancy to W is essentially $2\tau W$-dimensional. Though this bound on dimension is true for the best choice of orthonormal set (prolate spheroidal wave functions |4|), yet it will justify the reasoning behind any search for higher dimensional signal sets to achieve higher bandwidth efficiency. In both QPSK and MSK, signal duration $\tau$ is 2T, where T is the bit interval in the incoming data stream. Suppose the channel is bandlimited to $\frac{1}{2}$T on either side of the carrier, i.e. one sided bandwidth occupancy is W=1/T. With such a bandlimited channel a QPSK system will be able to transmit only ninety percent of its total power while an MSK system transmits ninety seven percent. The number of dimensions available within this bandwidth W=1/T is $2\tau W=4$. It is surprising that only two of them are utilized in QPSK and MSK. The remaining two are yet left to be played around with. So one can conceive of a modulation scheme with a bandwidth efficiency as much as twice that of QPSK or MSK. Since prolate spheroidal wave functions are not easy to implement, expectation of one hundred percent increase in bandwidth efficiency may be too much from a practical view point. Yet the extra two dimensions give some room for improving the bandwidth efficiency by increasing the dimensionality of the signal set at the cost of some extra bandwidth, if necessary.

First we briefly review some existing modulation schemes such as QPSK, OQPSK and MSK, all of which use two dimensional signal sets. Then we propose a new modulation scheme which uses the vertices of a hyper cube of dimension four as the signal space geometry. This proposed scheme makes use of two data shaping pulses and two carriers which are pairwise quadrature in phase; so it is named quadrature-quadrature phase shift keying or $Q^2PSK$. It is pointed out as a theorem that in the presence of AWGN any modulation scheme which utilizes the vertices of some hyper cube as signal space geometry has the same energy efficiency; this is true for any dimension of the hyper cube. As a consequence of the theorem, $Q^2PSK$ has the same energy efficiency as that of MSK, QPSK or OQPSK; but for a given bandwidth the transmission rate of $Q^2PSK$ is twice that of any one of the three other schemes. However, all these four schemes respond differently when they undergo bandlimiting. Considering ninety nine percent bandwidth of MSK as the definition of channel bandwidth, it is shown that $E_b/N_0$ requirement for achieving a BER of $10^5$ is 11.2 db for bandlimited $Q^2PSK$ and 9.6 db for MSK. Thus bandlimited $Q^2PSK$ achieves twice bandwidth efficiency of MSK only at the expense of 1.6 db or forty five percent increase in the average bit energy. Like MSK, $Q^2PSK$ has also self synchronization ability. Modulator-demodulator implementation and a scheme for synchronization will be described in detail in the last section.

BRIEF REVIEW OF QPSK, OQPSK and MSK

A block diagram of the QPSK modulation scheme is shown in FIG. 1. The input binary data stream $\{a_k\}$ arriving at the rate of $1/T$ is demultiplexed into two streams $a_1(t)$ and $a_2(t)$. The duration of each bit in the demultiplexed streams is twice the duration of the incoming bit. Streams $a_1(t)$ and $a_2(t)$ are multiplied by sine and cosine carriers and summed up to form the QPSK signal $s_{qpsk}(t)$:

$$s_{qpsk}(t) = \frac{1}{\sqrt{2}} a_1(t) \cos\left(2\pi f_c t + \frac{\pi}{4}\right) + \frac{1}{\sqrt{2}} a_2(t) \sin\left(2\pi f_c t + \frac{\pi}{4}\right) \quad (1)$$

$$= \cos(2\pi f_c t + \phi(t))$$

where $\phi(t)$, depending on $a_1(t)$ and $a_2(t)$, is one of $0°$, $\pm 90°$ and $180°$. Thus carrier phase during any 2T interval is one of the four phases. In the next 2T interval, if neither of the two bit streams changes sign, the carrier phase remains the same. If one of them changes sign, a phase shift of $\pm 90°$ occurs. A change of sign in both streams causes a phase shift of $180°$. Rapid changes in the carrier phase has serious deteriorating effects on the signal and the adjacent channel when it undergoes bandlimiting and hardlimiting operations. Those deteriorating effects are partially eliminated in offset quadrature phase shift keying (OQPSK) where the two bit streams are not allowed to change their sign simultaneously, thus avoiding the possibility of $180°$ phase shift. This is accomplished by skewing or delaying the bit stream $a_2(t)$ by an amount of time T as illustrated in FIG. 2. By pulse shaping, further elimination of changes in the carrier phase is possible. In fact, it is totally eliminated in minimum shift keying (MSK) where a cosinusoidal data shaping pulse is used in place of the rectangular one of OQPSK, as illustrated in FIG. 2. This pulse shaping in MSK also brings some spectral compactness over OQPSK. The MSK signal can be written as:

$$s_{msk}(t) = a_1(t) \cos\left(\frac{\pi t}{2T}\right) \cos(2\pi f_c t) + \quad (2)$$

$$a_2(t) \sin\left(\frac{\pi t}{2T}\right) \sin(2\pi f_c t)$$

$$= \cos\left[2\pi \left(f_c + \frac{b(t)}{4T}\right) t + \phi(t)\right]$$

where $b(t) = -a_1(t)a_2(t)$ and $\phi(t) = 0$ are $\pi$ according to $a_1 = +1$ or $-1$. Thus MSK signals can have one of two instantaneous frequencies, $f_c \pm 1/4T$. The spacing between the two frequencies is $1/2T$. This is the minimum spacing with which two FSK signals of duration T can be orthogonal; hence the name minimum shift keying (MSK).

It is, therefore, an object of this invention to provide a method for transmitting data wherein bandwidth efficiency is improved over known transmission systems.

It is another object of this invention to provide a digital transmission system wherein all four available dimensions are utilized.

It is a further object of this invention to provide a digital data transmission system wherein a significant increase in data transmission capacity is achieved, for a given bandwidth requirement, at the expense of only a modest increase in energy per bit.

It is also an object of this invention to provide a transmission system wherein data transmission capacity can be effectively doubled without producing intolerable intersymbol interference.

It is still another object of this invention to provide a multidimensional digital transmission scheme wherein the transmitted signal has a constant envelope.

It is a still further object of the invention to provide a data pulse shape whereby intersymbol interference is inhibited in a bandlimited transmission environment.

It is additionally an object of this invention to provide a multidimensional digital transmission scheme which can simply and economically be adapted to transmit information in various signal space dimensions.

SUMMARY OF THE INVENTION

The foregoing and other objects are achieved by this invention which provides an information transmission method wherein digital data, in the form of a data stream is demultiplexed to form several, illustratively four, demultiplexed data streams. Each of the demultiplexed data streams is modulated by a respective modulating signal having a carrier component and a pulse-shaping component. The pulse-shaping components in the respective modulating signals have a quadrature phase relationship and are preferably sinusoidal and cosinusoidal. In accordance with the invention, each of the data streams is coded to produce a respective stream of data words, each such word being formed of a predetermined number of the data pulses and a parity check bit. Such coding of the transmitted signal provides a constant amplitude envelope. In a specific illustrative embodiment where each such data word is formed of three data pulses, $a_1$, $a_2$, and $a_3$, and a parity check bit, $a_4$, the value of the parity check bit is determined in accordance with:

$$a_4(t) = -\frac{a_1(t)a_2(t)}{a_3(t)}$$

whereby the transmitted $Q^2PSK$ signal has a constant envelope. In some embodiments of the invention, particularly in band limited environments, the pulse shapes are selected to eliminate intersymbol interference.

Preferably the carrier components of the respective modulating signals are also in a quadrature phase relationship, and therefore, four dimensions of data transmission are achieved; two for the carrier and two for the data pulses in the demultiplexed data streams. Such a four dimensional transmission system has a doubled data transmission capacity over conventional systems, without requiring any additional bandwidth. The enhanced capacity is achieved at the expense of a modest increase in the energy per bit.

In accordance with a further aspect of the invention, four streams of data pulses are modulated simultaneously by combining a pulse-shaping signal with first and second carrier signal components. Each of the carrier signal components has the same frequency as the other, but with a quadrature phase relationship. Such a combination produces first and second composite modulation signals, each having first and second frequency components. In one embodiment of the invention, the first and second frequency components are symmetrical about a base carrier frequency. The first and second frequency components associated with each of the composite modulation signals are combined subtractively to produce a first pair of modulation signals, and additively to produce a second pair of modulation signals. The four modulation signals are combined with respective ones of the streams of data pulses, thereby producing four modulated streams of pulses having predetermined pulse shapes and quadrature pulse phase relationships with respect to each other.

In accordance with a still further aspect of the invention, a modulated information signal is demodulated by subjecting it to various stages of non-linear operation. In one embodiment of the invention, the modulated information signal is squared. The squared modulated information signal is subjected to low pass filtering to extract a frequency-limited component, and to band pass filtering for extracting a predetermined frequency component corresponding to a multiple of the frequency of the carrier signal. In a preferred embodiment, the frequency component has twice the frequency of the carrier signal. The extracted frequency-limited and predetermined frequency components are subjected a further non-linear operation. In one embodiment, where the further non-linear operation is a signal squaring, first and second timing signals corresponding to the frequency of the information in the modulated information signal, and the frequency of the carrier signal, are extracted therefrom.

BRIEF DESCRIPTION OF THE DRAWINGS:

Comprehension of the invention is facilitated by reading the following detailed description in conjunction with the annexed drawings, in which.

DETAILED DESCRIPTION

Figure 3:
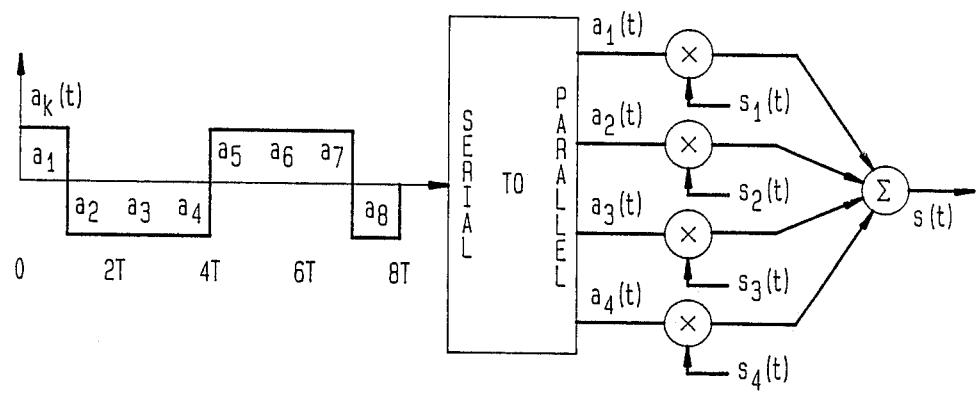
FIG. 3 is a function block and partially schematic representation of a Q²PSK modulator constructed in accordance with the invention.

FIG. 3 is a function block representation of a Q²PSK modulator constructed in accordance with the principles of the invention. As shown therein, an input data stream $a_k(t)$ which is demodulated via a serial to parallel converter into four demultiplexed data streams, $a_1(t)$ to $a_4(t)$.

QUADRATURE QUADRATURE PHASE SHIFT KEYING

Let us consider the following basis signal set:

$$s_1(t) = \cos(\pi t/2T) \cos 2\pi f_c t, \quad |t| \leq T \quad (3a)$$

$$s_2(t) = \sin(\pi t/2T) \cos 2\pi f_c t, |t| \leq T \quad (3b)$$

$$s_3(t) = \cos(\pi t/2T) \sin 2\pi f_c t, |t| \leq T \quad (3c)$$

$$s_4(t) = \sin(\pi t/2T) \sin 2\pi f_c t, |t| \leq T \quad (3d)$$

$$s_i(t) = 0, i = 1,2,3,4, |t| > T \quad (3e)$$

We write, $$p_1(t) = \cos(\pi t/2T) \text{ and} \quad (4a)$$

$$p_2(t) = \sin(\pi t/2T) \quad (4b)$$

Later $p_1(t)$ and $p_2(t)$, which are quadrature in phase, will be identified as data shaping pulses, and sine and cosine functions of frequency $f_c$ as carriers. It is to be noted that between any two signals in the set $\{s_i(t)\}$, there is a common factor which is either a data shaping pulse or a carrier component; the remaining factor in one is in quadrature with respect to the remaining factor in the other. This makes $\{s_i(t)\}$ a set of four equal-energy orthogonal signals under the restriction:

$$f_c = n/4T, n = \text{integer} \geq 2 \quad (5)$$

Also the orthogonality remains invariant under the translation of the time origin by multiples of 2T, which is the duration of each signal. In other words, if the definition of $s_i(t)$ in (3) be extended for all t, then one will get orthogonality over every interval of 2T centered around $t = 2mT$, m being an integer.

The orthogonality of $\{s_i(t - 2mT)\}$ suggests a modulation scheme, a schematic diagram of which is shown in FIG. 3. Data from an IID binary ($\pm 1$) source at a rate 2/T is demultiplexed into four streams $\{a_i(t)\}$; duration of each data pulse (rectangular shaped with strengths $\pm 1$) in the demultiplexed streams being 2T. Each data stream $a_i(t)$ is multiplied by the output $s_i(t)$ of a signal generator which continuously emits $s_i(t)$, defined over all t. The multiplied signals are summed to form the modulated signal $s(t)$.

At the receiver, suppose four identical coherent generators are available. Then one can make observations over intervals of length 2T and use the orthogonality of $\{s_i(t - 2mT)\}$ to separate out the data streams. A correlation receiver can perform this process of demodulation in an optimum sense of minimum probability of error in the presence of white Gaussian noise.

Figure 4:
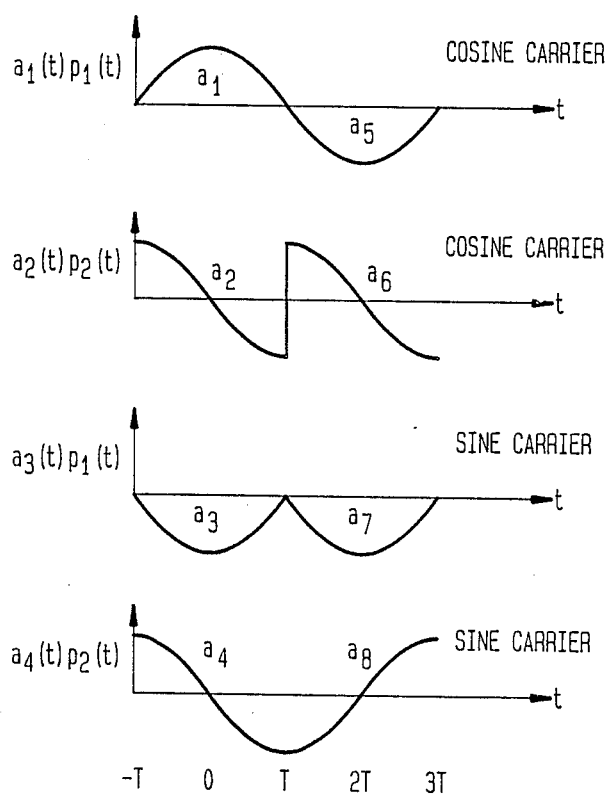
FIG. 4 is a timing diagram showing the waveforms of the various demultiplexed signals.

The modulating signal $s_i(t)$ has two fold effect on the bit streams $a_i(t)$: one is the wave shaping of the data pulse; the other is the translation of the baseband spectrum to a bandpass region. Shaping of the data pulses is illustrated in FIG. 4. It is to be noted that the two pulse trains associated with either carrier are orthogonal over any interval of integer multiple of 2T. This makes sense because the dimensionality of the signal set used in this scheme is four; two of them come from the orthogonality of the carriers, the remaining two from the orthogonality of the data shaping pulses $p_1(t)$ and $p_2(t)$. In other words, two carriers and two data shaping pulses are pairwise quadrature in phase. Hence the modulation scheme is named Quadrature-Quadrature Phase Shift Keying (Q²PSK).

The bit rate $R_b = 2/T$ of the input of the modulator in FIG. 3 is twice the bit rate we considered for QPSK and MSK schemes in the last section. This increase in the rate of transmission is due to increase in the signal space dimensions and as conjectured earlier, will result in a substantial increase in the bandwidth efficiency. But for a quantative comparison of the bandwidth efficiencies of Q²PSK and MSK one needs to know the spectral occupancy of the Q²PSK signal. This aspect of the invention will be discussed hereinbelow.

From the schematic diagram in FIG. 3, one can represent the Q²PSK signal as:

$$s_{q2psk}(t) = a_1(t) \cos\left(\frac{\pi t}{2T}\right) \cos(2\pi f_c t) + \quad (6a)$$

$$a_2(t) \sin\left(\frac{\pi t}{2T}\right) \cos(2\pi f_c t) + a_3(t) \cos\left(\frac{\pi t}{2T}\right) \sin(2\pi f_c t) +$$

$$a_4(t) \sin\left(\frac{\pi t}{2T}\right) \sin(2\pi f_c t)$$

$$= \cos[2\pi(f_c + b_{14}(t)/4T)t + \phi_{14}(t)] + \quad (6b)$$

$$\sin[2\pi(f_c + b_{23}(t)/4T)t + \phi_{23}(t)]$$

where, $$b_{14}(t) = a_1(t)a_4(t) \quad (7a)$$

$$\phi_{14}(t) = 0 \text{ or } \pi \text{ according as } a_1(t) = +1 \text{ or } 1 \quad (7b)$$

and, $$b_{23}(t) = +a_2(t)a_3(t) \quad (8a)$$

$$\phi_{23}(t) = 0 \text{ or } \pi \text{ according as } a_3(t) = +1 \text{ or } -1 \quad (8b)$$

Thus at any instant the Q²PSK signal can be analyzed as consisting of two signals; one is cosinusoidal with frequency either of $(f_c \pm \frac{1}{4}T)$, the other is sinusoidal with frequency either of $(f_c \pm \frac{1}{4}T)$. The separation between the two frequencies associated with either of the two signals is $\frac{1}{2}T$; this is the minimum spacing that one needs for coherent orthogonality of two FSK signals as in MSK. Also a comparison with (2) shows that the cosinusoidal part of Q²PSK signal in (6b) exactly represents an MSK signal. Therefore the Q²PSK signalling scheme can be thought as consisting of two minimum shift keying type signalling schemes, which, in some loose sense, are in quadrature with respect to each other. Since the two schemes are in quadrature, one can intuitively think that overall energy efficiency will be the same as that of conventional MSK with coinusoidal shape of data pulse.

FIG. 4 shows the wave shaping of the data pulses in the Q²PSK signal. As shown in this specific illustrative embodiment of the invention, the data pulses have either sinusoidal or cosinusoidal shapes, thereby providing a quadrature phase relationship therebetween. However, other pulse shapes having the quadrature phase relationship may be used in the practice of the invention.

ENERGY EFFICIENCY

An ultimate objective of all data communication systems is to reduce the bit error rate (BER) at the expense of a minimum amount of average bit energy ($E_b$). In practice, BER performance is usually evaluated under the assumption of an ideal channel corrupted only by additive white Gaussian noise with two sided spectral density $N_0/2$. The receiver is assumed to be an optimum one, e.g. a correlation receiver, which maximizes the probability of correct decision. A standard quantitative parameter for measuring BER performance is the energy efficiency (e); it is the ratio $E_b/N_0$ required to achieve a BER $P_b(E)=10^{-5}$.

The signal set $\{s_1(t)\}$ used in Q$^2$PSK is of dimension $N=4$. Each $s_1(t)$ represents one of four co-ordinate axes. With respect to this set of axes, a Q$^2$PSK signal can be represented as:

$$s(t)=[a_1(t),a_2(t),a_3(t),a_4(t)] \quad (9)$$

where the coordinates $a_1(t)$'s can have only one of two values $\pm 1$ with probability one half. The number of signals in the Q$^2$PSK signal set is $2^4$. The signals are equally probable and of equal energy, say $E_s$. Also it is easy to check that they represent the vertices of a hyper cube of dimension $N=4$; the center of the cube being at the origin of the coordinate axes. For this signal space geometry, the signal error probability for any N, $|5|$ is given by:

$$P_s(E)=1-(1-p)^N \quad (10)$$

where, $$P = Q(\sqrt{2E_s/NN_0}) \quad (11a)$$

$$Q(v) = \sqrt{\tfrac{1}{2\pi}} \int_v^\infty \exp(-x^2/2)dx \quad (11b)$$

Knowing signal error probability, one has upper and lower bound on bit error probability given by:

$$\tfrac{1}{N}P_s(E) \leq P_b(E) \leq P_s(E) \quad (12)$$

However an exact calculation of $P_b(E)$ is of considerable interest for comparing two modulation schemes. To do that we establish the following theorem.

Theorem:

In the presence of additive white Gaussian noise (AWGN) any modulation scheme which uses the vertices of some hyper cube as signal space geometry and an optimum receiver for detection has identical bit error probability given by:

$$P_b(E) = Q\left[\sqrt{\frac{2E_b}{N_o}}\right] \quad (13)$$

where $E_b$ is the average bit energy and $N_0/2$ is the two sided spectral density of AWGN. This probability of error holds for any dimension N of the hyper cube. The hyper cube is assumed to be placed symmetrically around the origin to minimize the requirement of average bit energy.

Proof:

Suppose the hyper cube is of dimension N. Then the number of signals in the modulated signal set is $2^N$; each of these signals represents a combination of N bits. If $P_{bi}(E)$ is the probability of error in the i$^{th}$ bit position, then the average bit error probability is:

$$P_b(E) = \frac{1}{N} \sum_{i=1}^N P_{bi}(E) = P_{b1}(E) \quad (14)$$

where the last equality comes form the equality of $P_{bi}(E)$ for all i because of the symmetry in signal space geometry. To calculate $P_{b1}(E)$ let us divide the signals into two groups: $\{(+1,a_2,a_3s \ldots , a_N)\}$ and its image partner $\{(-1,a_2,a_3,\ldots, a_N)\}$, where $a_1$'s can be either of $\pm 1$ with probability one half. These two groups of signals will lie on two parallel hyper planes of dimension (N 1). Then one can imagine another hyper plane of the same dimension which separates the two groups on its two sides and is equidistant from each group. The distance of any signal in either group from the midway hyper plane is $d/2=\sqrt{E_s/N}=\sqrt{E_b}$. Thus the signals with $+1$ in the first bit position are on one side of this plane at a distance $\sqrt{E_b}$ while the signals with $-1$ in the first bit position are on the other side at the same distance. So an error in the first bit position occurs only when the noise component n(t) associated with this bit position drives a signal down to the other side of the hyper plane. The probability of such an incident is:

$$P_{b1}(E) = \int_{\sqrt{E_b}}^\infty p_n(x)dx = Q\left[\sqrt{\frac{2E_b}{N_o}}\right] \quad (15)$$

where $P_n(x)$ is the probability density function of Gaussian noise with two sided spectral density $N_0/2$. Hence the overall bit error probability is:

$$P_b(E) = P_{b1}(E) = Q\left[\sqrt{\frac{2E_b}{N_o}}\right] \quad (16)$$

Since we have not assumed any particular value for N, probability of error given by (16) is valid for any dimension N of the hyper cube; hence the theorem.

From equation (10) one may observe that as N becomes infinitely large, signal error probability $P_s(E)$ goes to unity; this is true because if signal energy $E_s$ is fixed and dimension gets higher and higher, the signals become closer and closer. On the other hand, the above theorem asserts a bit error probability $P_b(E)$ independent of the dimension N. The explanation of this apparent contradiction lies in the following fact: in the derivation of the theorem we assumed a fixed bit energy $E_b$. So the signal energy $E_s$ no longer remains fixed; it increases linearly with the increase in dimension N. Thus the distance between the two hyper planes containing $\{(+1,a_1,a_2,\ldots, a_N)\}$ and $\{(-1,a_1,a_2,\ldots, a_N)\}$ remains fixed at $d=2\sqrt{E_b}$ and therefore, $P_b(E)=Q(\sqrt{2E_b/N_0})$ remains fixed while $P_s(E)$ does go to unity. In fact the above theorem illustrates that the hyper cube signal space geometry coupled with equally probable use of all vertices is equivalent to two-dimensional antipodal geometry.

The bit error probability given by the theorem implies a 9.6 db energy efficiency. BPSK uses two antipodal signals which can be considered as the vertices of a hyper cube of dimension one. Similarly QPSK and MSK, which use a set of four biorthogonal signals, can be considered as using the vertices of a hyper cube of dimension two. And Q$^2$PSK uses the vertices of a hyper cube of dimension four. So all of BPSK, QPSK, OQPSK, MSK and Q$^2$PSK belong to the same class of signalling schemes which use vertices of some hyper cube, and each of them has an energy efficiency 9.6 db; this is true when the channel is wide band and corrupted by AWGN only. If, in addition, the channel is bandlimited, as it happens to be in most practical situations, each of the five schemes responds differently. Due to intersymbol interference signal space geometry no long remains hyper cube and the energy efficiency is changed. To analyze the energy in bandlimited situation one needs to know about the spectral distribution of power and the effect of bandlimiting on signal space geometry. We will do those analysis in the next section.

SPECTRAL DENSITY AND EFFECT OF BANDLIMITING

Spectral Density:
One can represent a Q$^2$PSK signal as:

$$S_{q2psk}(t) = \frac{1}{\sqrt{T}} a_1(t)p_1(t) \cos 2\pi f_c t + \frac{1}{\sqrt{T}} a_2(t)p_2(t) \cos 2\pi f_c t + \frac{1}{\sqrt{T}} a_3(t)p_1(t) \sin 2\pi f_c t + \frac{1}{\sqrt{T}} a_4(t)p_2(t) \sin 2\pi f_c t \quad (17)$$

where the additional $1/\sqrt{T}$ is just a normalizing factor to make $$\frac{1}{\sqrt{T}} \cos\left[\frac{\pi t}{2T}\right] \text{ and } \frac{1}{\sqrt{T}} \sin\left[\frac{\pi t}{2T}\right]$$

unit energy pulses. Data streams $a_1(t)$'s are independent and at any instant each $a_1(t)$ can be either $+1$ or $-1$ with probability one half. So the Q$^2$PSK signal can be one of sixteen possible equally probable waveforms. Let us represent these waveforms by $m_i(t)$, i varying from 1 to 16. Probability of occurrence of $m_i(t)$ is $p_i = 1/16$ for all i. The signal set $\{m_i(t)\}$ has the following characteristics:
 (i) for each waveform $m_i(t)$, there is also a waveform $-m_i(t)$
 (ii) the probability of $m_i(t)$, and $-m_i(t)$ are equal
 (iii) the transitional probabilities between any two waveforms are the same.

Such a signalling source is said to be negative equally probable (NEP); the overall spectral density is given by |6|:

$$S_{q2psk}(f) = \sum_{i=1}^{16} p_i |M_i(f)|^2 \quad (18)$$

where $M_i(f)$ is the Fourier transform of $m_i(t)$. One can reasonably assume the carrier frequency $f_1 >> 1/T$; then for $f > 0$, each $M_i(f)$ is one of the following sixteen possible combinations:

$$\tfrac{1}{2}\{\pm P_1(f-f_c) \pm P_2(f-f_c) \pm jP_1(f-f_c) \pm jP_2(f-f_c)\}$$

where $P_1(f)$ and $P_2(f)$ are the Fourier transforms of data shaping pulses normalizes $p_{1n}(t)$ and $p_{2n}(t)$ given by:

$$p_{1n}(t) = \frac{1}{\sqrt{T}} \cos \frac{\pi t}{2T} \bigg|_{-T}^{T} \quad (19)$$

$$p_{2n}(t) = \frac{1}{\sqrt{T}} \sin \frac{\pi t}{2T} \bigg|_{-T}^{T} \quad (20)$$

Substituting the $M_i(f)$'s into (18) and noticing that all cross terms are cancelled out, one can write:

$$S_{q2psk}(f) = \tfrac{1}{2}[|P_1(f-f_c)|^2 + |P_2(f-f_c)|^2] \quad (21)$$

The equivalent baseband version of the spectral density is $$S^b_{q2psk}(f) = \tfrac{1}{2}[|P_1(f)|^2 + |P_2(f)|^2] \quad (22)$$

The Fourier transforms of the data shaping pulses are:

$$P_1(f) = \frac{4\sqrt{T}}{\pi}\left[\frac{\cos 2\pi fT}{1 - 16f^2T^2}\right] \quad (23)$$

$$P_2(f) = \frac{j16\sqrt{T}}{\pi}\left[\frac{fT \cos 2\pi fT}{1 - 16f^2T^2}\right] \quad (24)$$

Substituting (23) and (24) into (22), the spectral density is found to be:

$$\frac{1}{T} S^b_{q2psk}(f) = \left[\frac{8}{\pi^2}\right][1 + 16f^2T^2]\left[\frac{\cos 2\pi fT}{1 - 16f^2T^2}\right]^2 \quad (25)$$

Similarly spectral densities of MSK and OQPSK signalling schemes |2| are given by:

$$\frac{1}{T} S^b_{msk}(f) = \left[\frac{16}{\pi^2}\right]\left[\frac{\cos 2\pi fT}{1 - 16f^2T^2}\right]^2 \quad (26)$$

$$\frac{1}{T} S^b_{oqpsk}(f) = 2\left[\frac{\sin 2\pi fT}{2\pi fT}\right]^2 \quad (27)$$

where in all cases:

$$\int_{-\infty}^{\infty} S^b(f)df = 1$$

Figure 5:
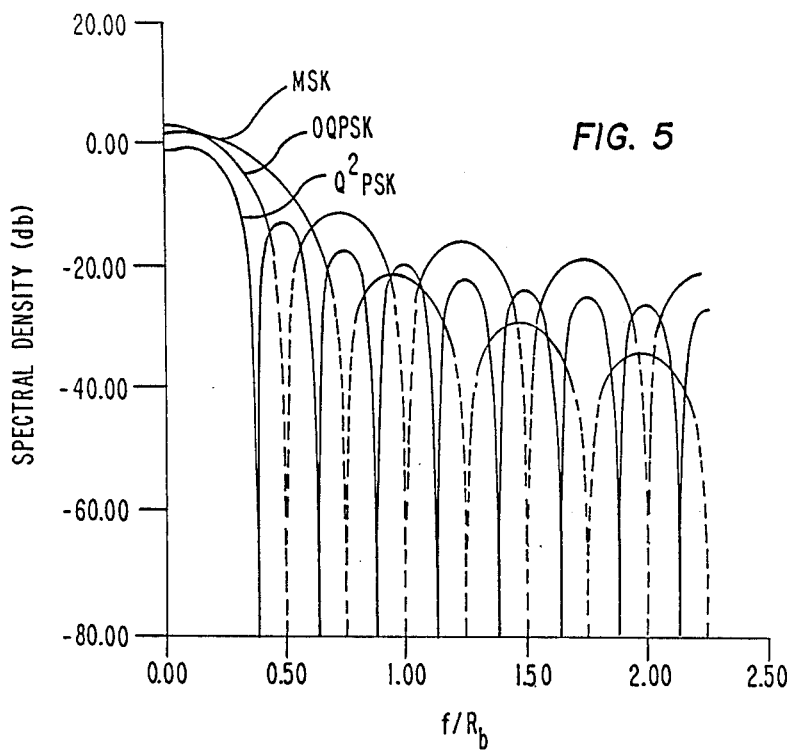
FIG. 5 is a graphical representation of the spectral densities of OQPSK, MSK, and Q²PSK.

Spectral densities of OQPSK, MSK and Q$^2$PSK are sketched in FIG. 5 as a function of normalized frequency $f/R_b$, where $R_b$, the bit rate, is $1/T$ for MSK and $2/T$ for Q$^2$PSK. It should be noted that for a given bit rate, the width of the main lobe in Q$^2$PSK is just one-half of the width of the MSK main lobe. Q$^2$PSK uses two different kinds of data pulses: one is $p_1(t)$ having a cosinusoidal shape as in MSK, the other is $p_2(t)$ having a sinusoidal shape. The shape of $p_1(t)$ is smoother than $p_2(t)$ in the sense that the later has jumps at $t = \pm T$; as a result, for large f. the spectral fall-off associated with $p_2(t)$ is proportional to $f^{-2}$ while that with $p_1(t)$ is as $f^{-4}$. The faster fall-off associated with cosinusoidal shape causes lower side lobes in MSK; side lobes in OQPSK and Q$^2$PSK are of the same order in magnitude but relatively higher than those of MSK. But just looking at the spectral lobes does not give any quantitative feelings about the spectral efficiencies; for that we need a measure of spectral compactness.

Figure 6:
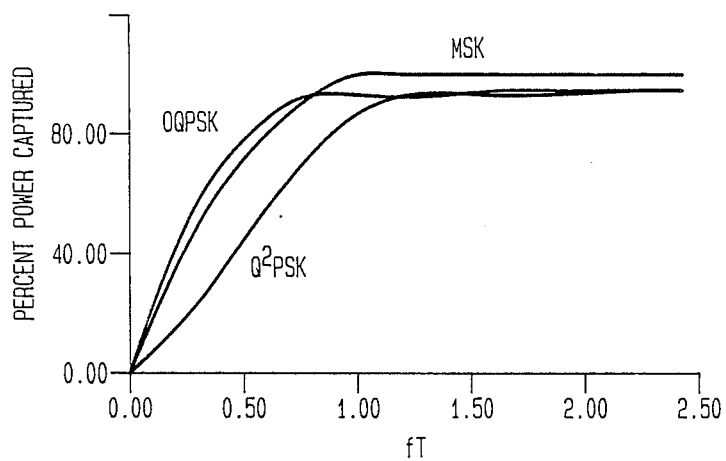
FIG. 6 is a graphical representation of the percentage of power captured as a function of bandwidth for OQPSK, MSK, and Q²PSK.

A measure of spectral compactness is the percent of total power captured in a specified bandwidth. This is plotted in FIG. 6. For small bandwidth, the percent power captured in Q$^2$PSK is smaller than that in OQPSK and MSK. Beyond a bandwidth of 1.2/T, the asymptotic behavior of QPSK and Q$^2$PSK become almost identical because of their same type of spectral fall-off as $f^{-2}$. MSK captures 99.1% of total spectral power in a bandwidth of W=1.2/T. With the same bandwidth power captured in QPSK and Q$^2$PSK are 90.6 and 91.13 percent respectively. Thus MSK seems to be more spectrally compact than Q$^2$PSK; yet bandwidth efficiency of Q$^2$PSK is higher because its data transmission rate is twice that of MSK. An exact calculation of bandwidth efficiency depends on the definition of bandwidth and the effect of bandlimiting on signal space geometries.

But before carrying out the bandlimiting analysis, a few comments on the spectral fall-off of Q$^2$PSK are worth mentioning. In contrast to MSK, the asymptotic spectral fall-off in Q$^2$PSK is as $f^{-2}$; this is due to abrupt discontinuities in the data pulse $p_2(t)$ at $t=\pm T$. So, in an attempt to achieve higher spectral compactness one may suggest a smoother pulse for $p_2(t)$. A reasonable suggestion is to replace the half sinusoid by a full sinusoid over $|t| \leq T$; this avoids the sharp discontinuities at $t=\pm T$ and results in MSK like asymptotic spectral fall-off as $f^{-4}$. But when the transmission band is finite and is below the asymptotic region, asymptotic fall-off has little to do with the spectral efficiency; strength of the first few lobes becomes a primary factor. So, in spite of faster spectral fall-off in the new Q$^2$PSK, its spectral compactness ought to be compared with that of Q$^2$PSK with half sinusoid as $p_2(t)$. Henceforth whenever we discuss the two Q$^2$PSK cases together, we denote the half sinusoid case as Q$^2$PSKH and the full sinusoid case as Q$^2$PSKF.

The baseband spectral density of Q$^2$PSKF-signal is given by $$\frac{1}{T} S^b_{q2pskf}(f) = \frac{8}{\pi^2} \left[ \frac{\cos 2\pi fT}{1 - 16f^2T^2} \right]^2 + \frac{2}{\pi^2} \left[ \frac{\sin 2\pi fT}{1 - 4f^2T^2} \right]^2 \quad (28)$$

Figure 7:
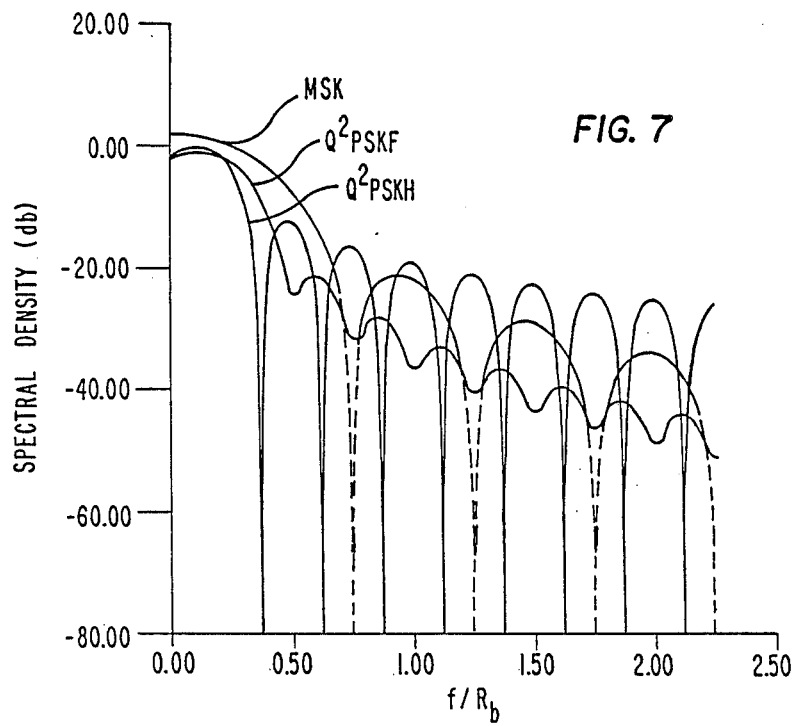
FIG. 7 is a graphical representation comparing the spectral densities of MSK, Q²PSKH, and Q²PSKF modulated signals.
Figure 8:
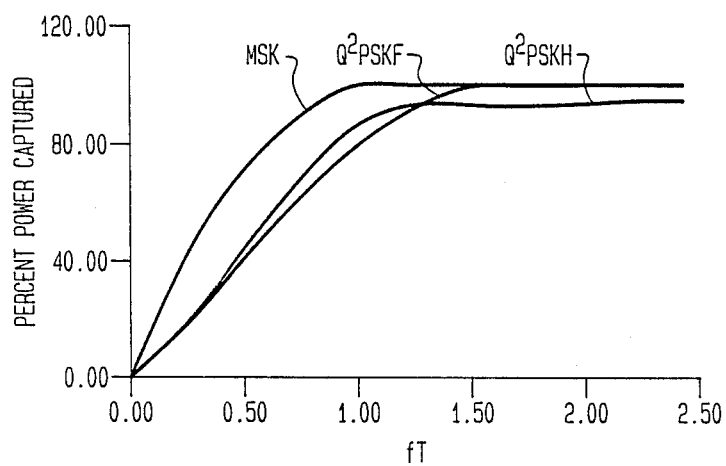
FIG. 8 is a graphical representation of the percentage of power captured as a function of bandwidth for MSK, Q²PSKH, and Q²PSKF modulated signals.

For the sake of a clear comparison, the spectral densities of MSK and Q$^2$PSKH are once again plotted in FIG. 7 along with the spectral density of Q$^2$PSKF. The main lobe of Q$^2$PSKF is wider than that of Q$^2$PSKH compared to Q$^2$PSKH, the side lobes of Q$^2$PSKF are relatively lower in strength. FIG. 8 compares the spectral compactness of Q$^2$PSKH and MSK; it shows that unless the bandwidth exceeds 1.25/T, the percent power captured by Q$^2$PSKF is less than that with either Q$^2$PSKH and MSK. With a bandwidth of 1.25/T, which is the 99% power bandwidth of MSK, Q$^2$PSKF captures 89.90% while Q$^2$PSKH 91.13% of total power. Thus in spite of faster asymptotic spectral fall-off, Q$^2$PSKF captures almost the sme (in fact a little less) power as Q$^2$PSKH. But to make a precise statement about which of the two schemes is more energy efficient, one needs to look into the effect of bandlimiting on signal space geometries and their consequences on energy efficiencies. We now do the analysis on bandlimiting.

Effect of Bandlimiting:

Consider an existing MSK scheme which allows a bandwidth of 1.2/T so that almost the entire spectrum (99.1% power) is available at the receiver. Suppose the MSK modulator is replaced by a Q$^2$PSK modulator and the modulator output, before transmission, is bandlimited to 1.2/T around the carrier frequency $f_c$. Our object is to compare the energy and the bandwidth efficiencies of the bandlimited Q$^2$PSK with the existing MSK scheme. We first consider the half sinusoid case (Q$^2$PSKH); the same analysis will also hold for the full sinusoid case (Q$^2$PSKF).

Thus we are assuming the 99% power bandwidth of MSK as the definition of channel bandwidth, i.e. W=1.2/T. The bit rate in MSK then being $R_b^{msk}=1/T$, the bandwidth efficiency is $b_{msk}=0.83$. The bit rate and the bandwidth efficiency of both Q$^2$PSKH and Q$^2$PSKF are $R_b^{q2psk}=2/T$ and $b_{q2psk}=1.66$ respectively. Thus there is one hundred percent increase in the bandwidth efficiency over MSK without any change in bandwidth; this increase is evidently due to increase in the dimensionality of the signal space.

With the above definition of channel bandwidth an MSK signal gets through almost undistorted, so the energy efficiency is maintained at its ideal value of 9.6 db. A Q$^2$PSKH scheme, on the other hand, when bandlimited to 1.2/T, allows transmission of only 91.13% of total spectral power. Thus there is a loss of some spectral components; this loss causes spread of the baseband data pulses which in turn causes intersymbol interference (ISI). The effect of this ISI can be equivalently considered as changing the signal space geometry. The following analysis will show that this change in the geometry results in an energy efficiency which is somewhat higher than the ideal value of 9.6 db.

In an attempt to find the new signal space geometry, it has been noted that because of the orthogonality of the two carriers, the spreading of the data pulses associated with either carrier does not have any ISI effect on the signal components associated with the other carrier. So the effect of bandlimiting on the geometry of the baseband signal space associated with either carrier can be analyzed separately and independently of the other. Once the bandlimited baseband signal space geometries are known, the overall signal space geometry of the bandlimited Q$^2$PSK signal immediately follows from the product space of the individual baseband signal spaces.

Before bandlimiting, the baseband signal space geometries associated with both carriers are identical and each of them is biorthogonal. Since identical pair of data pulses are used on either carrier, after bandlimiting also the baseband geometries will remain identical; but due to ISI they will no longer remain biorthogonal. After bandlimiting, the baseband signal associated with either carrier is of the following form:

$$S^b_{q2pskh}(t) = \qquad (29)$$

$$\frac{A}{\sqrt{T}} \sum_{t=a}^{\infty} [a_{1,k}p_{1b}(t - 2kT) + a_{2,k}p_{2b}(t - 2kT)] \quad T \leq t \leq T$$

Where A is an amplitude factor, $p_{1b}(t)$ and $P_{2b}(t)$ are the bandlimited versions of data pulses $p_1(t)$ and $p_2(t)$, and $a_{l,k}$'s being either +1 or −1 represent the information bits over the interval $(k-1)T<t<(k+1)T$.

Squaring both sides of (29) one can write the squared bandlimited signal as:

$$[S^b_{q2pskn}(t)]^2 = \frac{A^2}{T}\left[\sum_k \{p^2_{1b}(t-2kT) + p^2_{2b}(t-2kT)\} + 2\sum_j \sum_{k(j\neq k)} a_{1,j}a_{1,k}p_{1b}(t-2jT)p_{1b}(t-2kT) + 2\sum_j \sum_{k(j\neq k)} a_{2,j}a_{2,k}p_{2b}(t-2jT)p_{2b}(t-2kT) + 2\sum_j \sum_k a_{1,j}a_{2,k}p_{1b}(t-2jT)p_{2b}(t-2kT)\right] \quad (30)$$

The expected value of the squared signal is given by:

$$E[S^b_{q2pskh}(t)]^2 = \frac{A^2}{T}\left[\sum_k p^2_{1b}(t-2kT) + \sum_k p^2_{2b}(t-2kT)\right] \quad (31)$$

where we used the facts that:

$$E\{a_{1,j}a_{1,k}\} = \delta_{jk} \quad (32a)$$

$$E\{a_{2,j}a_{2,k}\} = \delta_{jk} \quad (32b)$$

$$E\{a_{1,j}a_{2,k}\} = 0 \quad (32c)$$

where $\delta_{jk}$ is the Kronecker delta.

Hence the average energy per transmission of each bit is given by $$E_b = \frac{1}{2} \int_{-T}^{T} E[S^b_{q2pskh}(t)]^2 \, dt \quad (33)$$

$$= \frac{1}{2} \frac{A^2}{T} \int_{-\infty}^{\infty} [p^2_{1b}(t) + p^2_{2b}(t)] \, dt$$

$$= 0.9113 \, A^2$$

In the above analysis we assumed that bandlimiting was carried away by an ideal bandpass filter placed symmetrically around the carrier. It may be useful to be noted that after this filtering, the truncated spectra $P_{1b}(f)$ and $P_{2b}(f)$ of the bandlimited pulses retain their even and odd symmetry around the carrier frequency $f_c$; as a result $p_{1b}(t)$ and $p_{2b}(t)$ are not time limited any more, but they maintain mutual orthogonality. In spite of that mutual orthogonality, finding the signal space geometry of the signal represented by (29) becomes virtually impossible unless we observe the following facts.

(i) With a bandwidth of 1.2/T, the data pulse $p_1(t)$ gets through almost undistorted; 99.1% of its total spectral power lies within that bandwidth. Therefore $$p_{1b}(t) \approx p_1(t) = \cos\frac{\pi t}{2T} \quad |t| \leq T \quad (34)$$

$$= 0 \quad |t| > T$$

(ii) With a bandwidth of 1.2/T, the data pulse $p_2(t)$ gets through with only 83.17% of its total spectral power, of this 83.17% power, 82.5% is concentrated over $|t| \leq 3T$. Thus the bandlimited pulse $p_{2b}(t)$ concentrates most of its energy (99.2%) over $|t| \leq 3T$. So one can reasonably assume that $p_{2b}(t)$ is essentially of duration $(-3T, 3T)$.

With the two observations mentioned above (29) reduces to $$s^b_{q2pskh}(t) = -\frac{A}{\sqrt{T}}\left|a_{1,0}p_1(t) + \sum_{k=-1}^{1} a_{2,k}p_{2b}(t-2kT)\right| \quad (35)$$

$$= -\frac{A}{\sqrt{T}} \mid a_{1,0}p_1(t) + a_{2,0}p_{2b}(t) + a_{2,-1}p_{2b}(t+2kT) +$$

$$a_{2,1}p_{2b}(t-2kT)) \quad -T < t < T$$

In order to find the signal space geometry with respect to a basis set $$\left\{\frac{1}{\sqrt{T}}p_1(t), \frac{1}{\sqrt{T}}p_2(t)\right\},$$

it is sufficient to look at $$s^b_{q2psk}(t) \text{ over } |t| < T.$$

In the absence of the two ISI terms on the right hand side of (35), the signal point coordinates would have been one of the four possibilities: $A|a_{10}, a_{20}R(0)|$, where $R(0)$ is the time cross-correlation between $p_{2b}(t)$ and $p_2(t)$. But because of ISI, the signal points will also depend on the information bits $a_{2,-1}$ and $a_{2,1}$ which are immediate left and right to the observation bits $a_{1,0}$ and $a_{2,0}$. Thus signal space geometry is dependent on the data sequence; depending on the values of $a_{2,-1}$ and $a_{2,1}$, there are four possible geometries each with a probability of 1/4.

Case I.

$$a_{2,-1} = +1, a_{2,1} = +1$$

With respect to the basis set $$\left\{\frac{1}{\sqrt{T}}p_1(t), \frac{1}{\sqrt{T}}p_2(t)\right\},$$

the signal points are represented by the following set $$S_{+1,+1} = (x_1, y_1) \quad (36a)$$

$$S_{-1,+1} = (-x_1, y_1) \quad (36b)$$

$$S_{-1,-1} = (-x_1, -y_2) \quad (36c)$$

$$S_{+1,-1} = (x_1, -y_2) \quad (36d)$$

Where the subscripts on signal points S's represent the values of the observation bits $\alpha_{10}$ and $\alpha_{20}$ and the coordinate values are given by $$x_1 = \frac{A}{T}\int_{-T}^{T}\{p_1(t) + p_{2b}(t+T) + p_{2b}(t-T)\}p_1(t) \approx A \quad (37a)$$

$$y_1 = \frac{A}{T}\int_{-T}^{T}\{p_{2b}(t) + p_{2b}(t+T) + p_{2b}(t-T)\}p_2(t) \approx 0.7A \quad (37b)$$

$$y_2 = \frac{A}{T} \int_{-T}^{T} \{-p_{2b}(t) + p_{2b}(t+T) + p_{2b}(t-T)\} p_2(t) \approx 0.96A \quad (37c)$$

Figure 9:
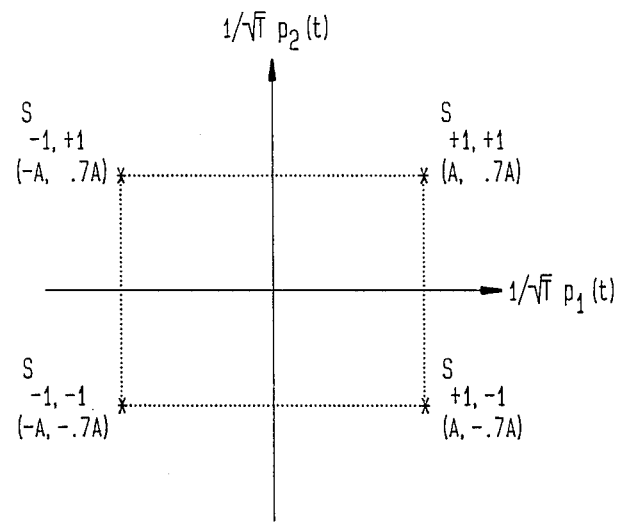
FIG. 9 is a graphical representation of the baseband signal space geometry of band-limited Q²PSK.

The signal space geometry has been depicted in FIG. 9. It is to be noted that the geometry is a rectangular one with unequal sides. The signal points corresponding to other combinations of $a_{2,-1}$ and $a_{2,1}$ are summarized in the following table.

TABLE I

| Case $a_{2,-1};a_{2,1}$ | I +1,+1 | II −1,−1 | III +1,−1 | IV −1,+1 |
|---|---|---|---|---|
| $S_{+1,+1}$ | $(x_1,y_1)$ | $(x_1,y_2)$ | $(x_2,y_3)$ | $(x_3,y_3)$ |
| $S_{-1,+1}$ | $(-x_1,y_1)$ | $(-x_1,y_2)$ | $(-x_3,y_3)$ | $(-x_2,y_3)$ |
| $S_{-1,-1}$ | $(x_1,-y_2)$ | $(-x_1,-y_1)$ | $(-x_3,-y_3)$ | $(-x_2,-y_3)$ |
| $S_{+1,-1}$ | $(x_1,-y_2)$ | $(x_1,-y_1)$ | $(x_2,-y_3)$ | $(x_3,-y_3)$ | where $x_1, y_1, y_2$ values are given in (37) and $x_2 \approx 0.99$ A, $x_3 \approx 1.01$ A, $y_3 \approx 0.83$ A. The effect of bandlimiting on baseband signal space is thus to change the square (conventional biorthogonal) geometry into rectangular one. Now, if the two baseband signal spaces associated with two carriers are combined to form the product space, the original hyper cube geometry turns into a rectangular hyper parallelopiped of dimension four. The hyper parallelopiped is not symmetrically palaced around the origin. It is important and interesting to note that the hyper parallelopiped sides are very much data dependent. Essentially there are sixteen different data dependent situations, each of which has equal probability of occurrence, but different parallelopiped for the signal space geometry. Since geometry is dependent on data sequence, a single particular receiver cannot be optimum in all situations. So one needs to look for a receiver which minimizes the overall bit error probability; in other words the receiver design should not be biased to any particular one of the sixteen different geometries.

We consider matched filtering followed by a binary decision on each of the four signal axes as a candidate for the receiver. In other words, we correlate the received signal with each of the four basis signals $\{s_i(t)\}$ given by (3) and take a binary decision on each of the four correlator outputs. As we see from Table 1, the binary levels (e.g. $x_3 = 1.01$ A, $-x_2 = -0.99$ A in case IV) at the correlator output are not equal in magnitude. So the optimum threshold which minimizes the probability of error lies at the midway of the two levels (e.g. $\frac{1}{2}(x_3-x_2)$) and is different from zero level. This optimum threshold is a function of the data sequence and therefore is not tractable. In this situation, it should be observed that Table 1 reflects a particular harmony in the clustering of signal points; the coordinate levels $x_1$ (or $y_1$) are not all the same, yet occurrence of the positive level $x_1$ (or $y_1$) always accompanies, with equal probability, a negative level $-x_1$ (or $y_1$). Therefore if we always set the binary threshold at zero level, the receiver will not favour any particular level in any biased way. With this setting of threshold the average bit error probability is given by, $$P_b(E) = \frac{1}{8}[2U(x_1) + U(x_2) + U(x_3) + U(y_1) + U(y_2) + 2U(y_3)] \quad (38)$$

where $$U(x) \approx Q\left[1.48\left(\frac{x}{A}\right)\sqrt{\frac{E_b}{N_0}}\right] \quad (39)$$

and the function Q(.) has been defined in (11). It follows from (38) and (39) that the $E_b/N_0$ requirement in a bandlimited Q²PSKH for a bit error rate of $10^{-5}$ is 11.2 db while that for MSK is 9.6 db. The Q²PSKH achieves twice the bandwidth efficiency of MSK only at the expense of 45% increase in the average bit energy. A rigorous simulation of the Q²PSKH scheme confirmed this result to within 1.4% error, which probably resulted from the assumption that 99.1% of the spectral power lies within the bandwidth of 1.2/T. In comparison to Q²PSKH, the deteriorating effect of ISI is more severe in Q²PSKF. Bit error probability given by (38) and (39) also holds for Q²PSKF except that the signal point coordinate values are different. Q²PSKF coordinate values are $x_1 = 1.0$ A, $x_2 = 0.95$ A, $x_3 = 1.05$ A; $y_1 = 0.99$ A, $y_2 = 0.64$ A, $y_3 = 0.81$ A; This leads to an energy efficiency $E_b/N_0 = 12.0$ db. Thus Q²PSKF achieves twice the bandwidth efficiency of MSK at the expense of 73% increase in the average bit energy. We see, therefore, that although Q²PSKF has faster asymptotic spectral fall off, Q²PSKH is superior to Q²PSKF in energy efficiency for the given definition of bandwidth as $W = 1.2/T$. However, in an attempt to reduce the energy efficiency, any increase in bandwidth beyond 1.2/T does not help either of the two Q²PSK schemes much unless a substantial loss in the bandwidth efficiency is suffered. So, between two Q²PSK schemes. Q²PSKH is the better one to MSK to increase the bandwidth efficiency by a factor of two over MSK.

To achieve twice the bandwidth efficiency of MSK, Q²PSKH costs about a 45% increase in the average bit energy. One may like to compare this increase with the increase in bit energy required for a multilevel MSK having the same bandwidth efficiency as bandlimited Q²PSKH. The set of four signals used in ordinary MSK is biorthogonal (square geometry); the data pulse associated with each of the two carriers is either a positive or a negative cosine pulse of duration 2T, i.e. the possible numbers of levels in the basic data pulse is two. For a multilevel MSK, in order to achieve twice the bandwidth efficiency of biorthogonal MSK, the number of amplitude levels in the data pulse must be four. In the next section we do the analysis for energy efficiency of four-level MSK and compare this scheme with bandlimited Q²PSKH.

The 99% power bandwidth (W) of Q²PSKF is 1.75/T, where 2/T is the bit rate ($R_b$). With this as the definition of channel bandwidth, there will be no noticeable intersymbol interference (ISI) at the receiver, and therefore, energy efficiency will be retained at 9.6 db, as is the case of MSK. The bandwidth efficiency will be $R_b/W = 1.14$ which is 37% higher than the value 0.83 MSK. Q²PSKF is a constant phase frequency shift keying (CPFSK) which increases the bandwidth efficiency by 37% over MSK without any requirement of increase in the average bit energy.

Q²PSK vs MULTILEVEL MSK

Figure 1:
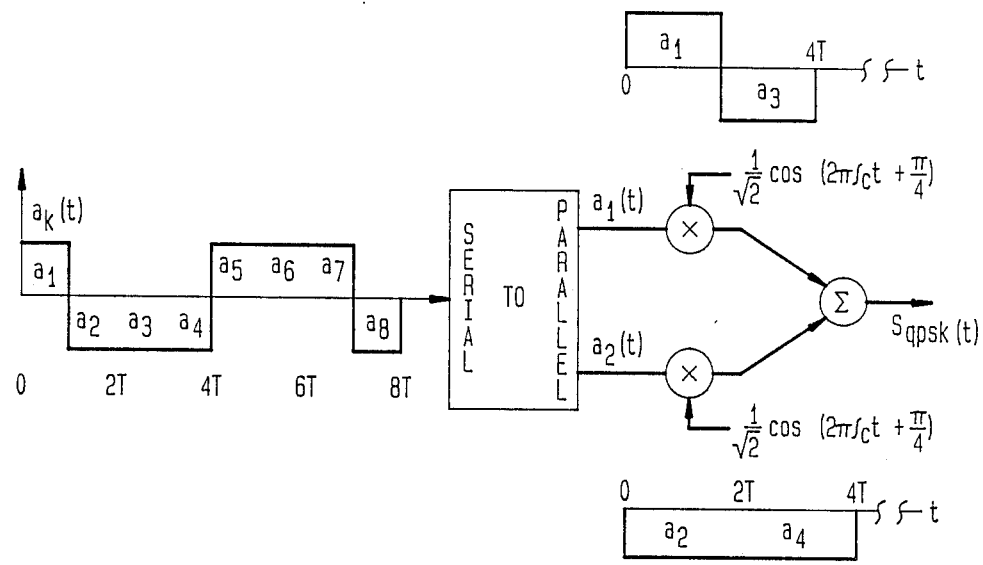
FIG. 1 is a function block and partially schematic representation of a quadrature phase shift keying modulator.
Figure 2:
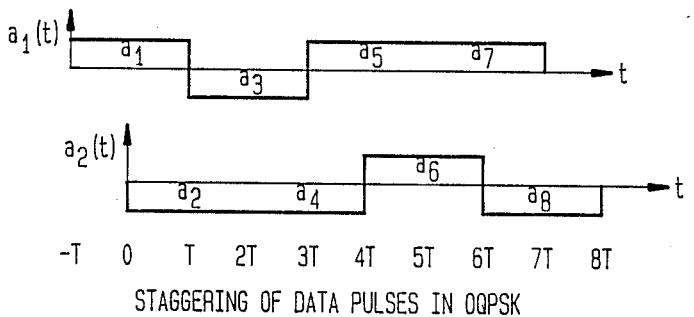
FIG. 2 is a timing diagram comparing staggered data pulses in an OQPSK system and an MSK system.
Figure 2:
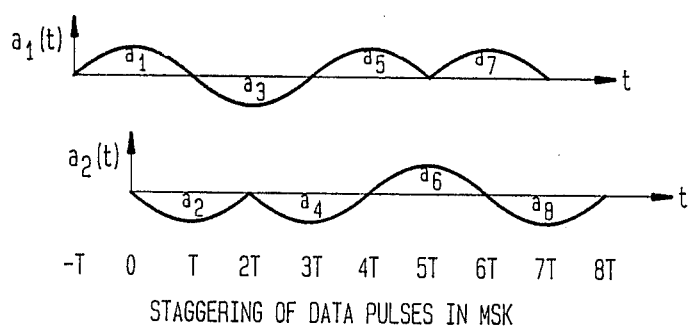
Figure 10:
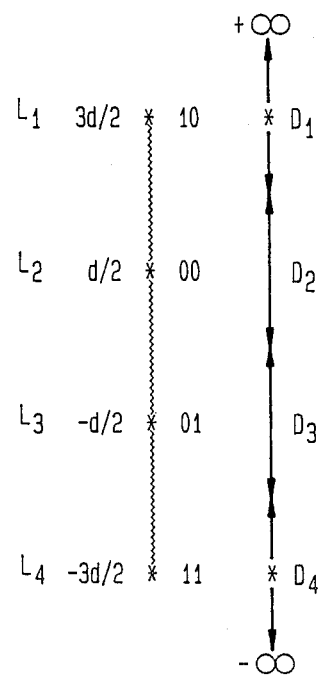
FIG. 10 is a diagrammatic representation of a coding scheme for four-level MSK.
Figure 11:
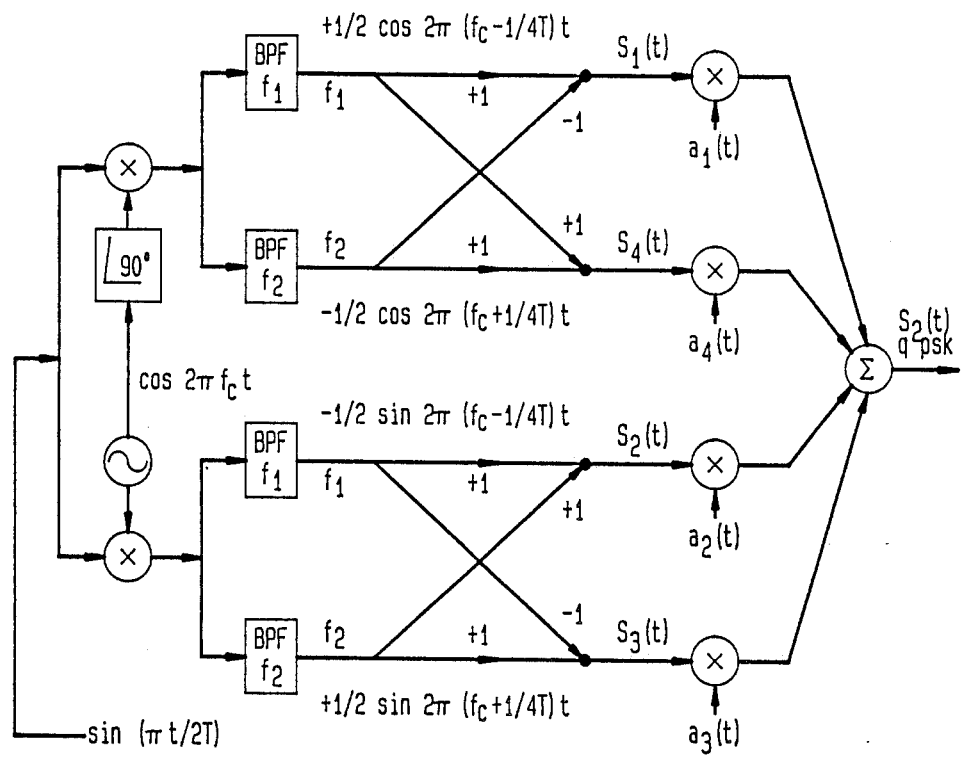
FIG. 11 is a function block representation of a Q²PSKH modulator constructed in accordance with the principles of the invention.

The four level MSK scheme is similar to the conventional biorthogonal MSK scheme except the fact that here each pair of input data bits (each bit being of duration T/2) is first coded by a 2:1 coder into one of the four possible levels $L_1$, i=1,2,3,4. The stream of coded levels (each level being of duration T) is then treated as the input to a conventional MSK modulator. So, the amplitude of the cosine shaped data pulses, as described in FIG. 2, instead of being only +1 or −1, takes one of the four values from the set $\{L_1\}^4$ as shown in FIG. 10. This four level scheme therefore accepts twice as many input data bits are ordinary MSK. To minimize the average bit energy requirement for a given probability of error, the amplitude levels are assumed to be placed symmetrically around origin as illustrated in FIG. 11. The optimum decision regions $D_1$ for each level $L_1$ are also shown. The coding has been performed in such a way that adjacent levels differ by one bit only; this will reduce the average bit error rate. If we maintain the 99% power bandwidth (W=1.2/T) as the channel bandwidth, there will be no noticeable intersymbol interference. In that situation, the channel is completely defined by a set of probabilities $\{p_{i,j}\}^4$ where $p_{ij}$ is the probability that level $L_1$ is transmitted and $L_j$ is detected. The average bit error probability is given by, $$P_b(E) = \frac{1}{4} \sum_{i=1}^{4} P_{bi} \qquad (40)$$

where $P_{bi}$ is the bit error probability if only the $i^{th}$ level were allowed to be transmitted. By trivial reasoning one can write $$P_{b1} = \frac{1}{4}(p_{12} + 2p_{13} + p_{14}) \qquad (41a)$$

$$P_{b2} = \frac{1}{4}(p_{21} + p_{23} + 2p_{24}) \qquad (41b)$$

and by symmetry, $$P_{b4} = P_{b1} \qquad (42a)$$

$$P_{b3} = P_{b2} \qquad (42b)$$

$$p_{12} = p_{23} \qquad (42c)$$

Hence the average bit error probability is $$P_b(E) = \frac{1}{4}[2p_{12} + 2p_{13} + 2p_{24} + p_{14} + p_{21}] \qquad (43)$$

Now referring to FIG. 11 and writing n(t) for the flat noise component, $$p_{12} = \text{Prob}\left[-\frac{d}{2} > n(t) > -\frac{3d}{2}\right] \qquad (44a)$$

$$= Q\left[\frac{d/2}{\sqrt{N_0/2}}\right] - Q\left[\frac{3d/2}{\sqrt{N_0/2}}\right]$$

$$= Q(r) - Q(3r)$$

where, $$r\sqrt{\frac{4E_b}{N_0}}$$

and $$E_b = 5d^2/8$$

is the average bit energy.
Similarly, $$p_{13} = Q(3r) - Q(5r) \qquad (44b)$$

$$p_{14} = Q(5r) \qquad (44c)$$

$$p_{21} = Q(r) \qquad (44d)$$

$$p_{24} = Q(3r) \qquad (44e)$$

Hence the average bit error probability is $$P_b(E) = \frac{1}{4}[3Q(r) + 2Q(3r) - Q(5r)] \qquad (45)$$

It follows from (45) that for a bit error rate of $10^{-6}$, a four-level MSK requires 13.4 db $E_b/N_0$. Thus in achieving twice bandwidth efficiency of biorthogonal MSK, the four-level MSK requires about 142% increase in the average bit energy; whereas with $Q^2$PSKH and $Q^2$PSKF the increments are 45% and 73% respectively. Thus $Q^2$PSKH turns out to be a more energy efficient candidate to increase the bandwidth efficiency by a factor of two over ordinary or biorthogonal MSK. Henceforth whenever we mention $Q_2$PSK we mean $Q^2$PSKH. Results of this section are summarized in the following table.

TABLE II

| Type of modulation | Signal duration = 2T Bandwidth = 1.2/T | | | |
|---|---|---|---|---|
| | MSK biorthogonal | $Q^2$PSKH | $Q^2$PSKF | MSK Four-level |
| Bandwidth efficiency | 0.83 | 1.66 | 1.66 | 1.66 |
| $E_b/N_0$ for $P_b(E) = 10^{-5}$ | 9.6 db | 11.2 db | 12.0 db | 13.4 db |

$Q^2$PSK MODULATOR DEMODULATOR AND SYNCHRONIZATION SCHEME

A block diagram of a $Q^2$PSK (or $Q^2$PSKH) modulator is shown in FIG. 11. Two phase coherent sine and cosine carriers are multiplied by an external clock signal at one eighth the bit rate to produce phase coherent sine and cosine signals of frequencies $$f_1 = f_c - \frac{1}{4T} \text{ and } f_2 = f_c + \frac{1}{4T}.$$

These signals are then separated by means of narrow bandpass filters and combined with appropriate polarity to form the basis signal set $\{S_i(t)\}^4$ of equation (3). The advantage of deriving the basis signals in this fashion (instead of generating them independently) is that the signal coherence and the deviation ratio are largely unaffected by any small variation in the incoming data rate. These basis signals are multiplied by the demultiplexed data streams and then added to form the $Q^2$PSK signal defined in eq.(6).

Figure 12:
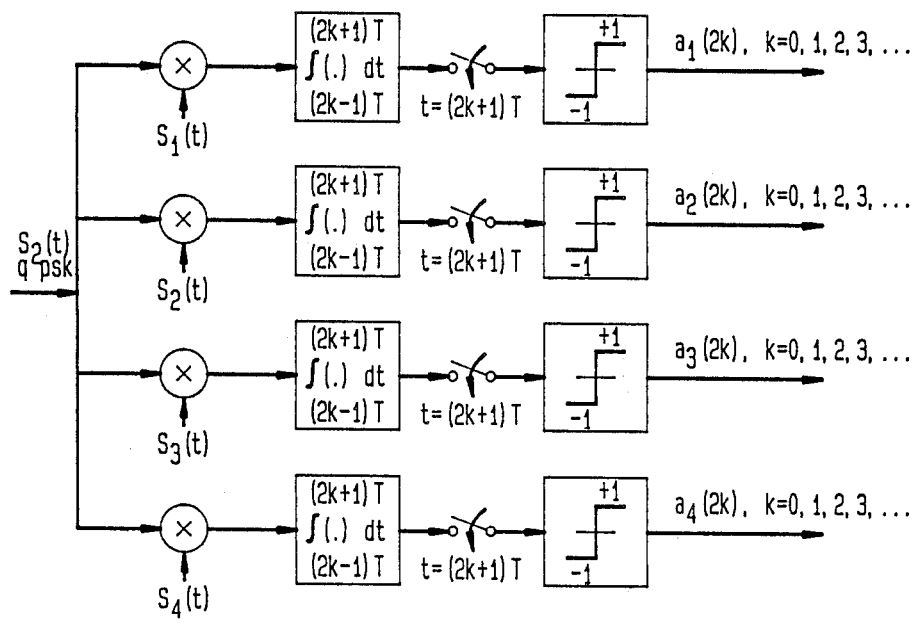
FIG. 12 is a function block representation of a Q²PSK demodulator constructed in accordance with the invention.

A block diagram of the $Q^2$PSK demodulator is shown in FIG. 12. The received signal (which is given by eq.(6) in the absence of noise and ISI) is multiplied by each of the basis signals individually and integrated over an interval of 2T. This multiplier-integrator combination constitutes correlation detection or matched filtering, an optimum coherent receiver in absence of ISI. Binary decisions followed by integrators give an estimate of the four binary data streams $a_i(t)$, i=1,2,3,4.

Figure 13:
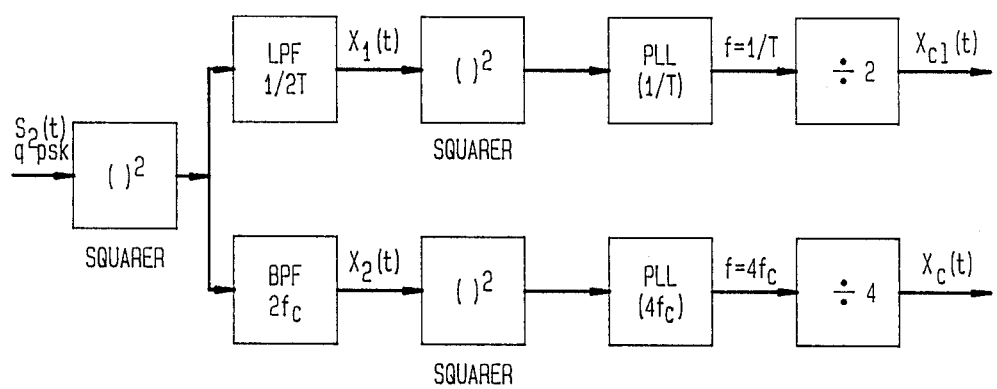
FIG. 13 is a function block representation of a synchronization arrangement for demodulating Q²PSK signals.

One of the basic problems in coherent demodulation is the recovery of the modulating signal phase and bit timing information from the received signal. In the present situation, we need to recover the basis signal set $\{s_1(t)\}$ and a clock signal at one fourth the bit rate. These signals can be derived from the $Q^2PSK$ modulated signal by a nonlinear operation, such as squaring, and appropriate filtering as shown in FIG. 13.

If the $Q^2PSK$ modulated signal (eq.6) passes through a squaring device, at the output we get, $$s_{q2psk}^2(t) = 1 + \tfrac{1}{2}(a_1a_2 + a_3a_4)\sin\left(\frac{\pi t}{T}\right) + \tag{46}$$

$$\tfrac{1}{2}(a_1a_2 - a_3a_4)\sin\left(\frac{\pi t}{T}\right)\cos(4\pi f_c t) +$$

$$\cos(\theta_{12} - \theta_{34})\sin(4\pi f_c t) +$$

$$\cos(\theta_{12} + \theta_{34})\cos\left(\frac{\pi t}{T}\right)\sin(4\pi f_c t) +$$

$$\sin(\theta_{12} + \theta_{34})\sin\left(\frac{\pi t}{T}\right)\sin(4\pi f_c t)$$

where, $$\theta_{12}(t) = \tan^{-1}\left(\frac{a_2(t)}{a_1(t)}\right) \tag{47a}$$

$$\theta_{34}(t) = \tan^{-1}\left(\frac{a_4(t)}{a_3(t)}\right) \tag{47b}$$

There are five components on the right of (46) which carry the required clocking and carrier phase information. But it can be shown that the expected value of each of these five components vanishes separately. So to recover the clocking and the carrier phase information, we need filtering and further nonlinear operation. By a lowpass and a bandpass filtering of the squared signal one may construct two signals $x_1(t)$ and $x_2(t)$ as $$x_1(t) = \tfrac{1}{2}(a_1a_2 + a_3a_4)\sin\left(\frac{\pi t}{T}\right) \tag{48}$$

$$x_2(t) = \cos(\theta_{12} - \theta_{34})\sin(4\pi f_c t) \tag{49}$$

After squaring $x_1(t)$, $x_2(t)$ and taking the expectation one can show $$E(x_1^2(t)) = \tfrac{1}{4}\left(1 - \cos\frac{2\pi t}{T}\right) \tag{50}$$

$$E(x_2^2(t)) = \tfrac{1}{2}(1 - \cos 9\pi f_c t) \tag{51}$$

Thus, on the average, $x_1^2(t)$ and $x_2^2(t)$ contains spectral lines at $1/T$ and $4f_c$. One can use these lines to lock phase-locked loops (not shown) and carry out frequency divisions to recover the clocking and the carrier information as $$x_{c1}(t) = \cos\frac{\pi t}{T} \tag{52}$$

and $$x_c(t) = \cos 2\pi f_c t$$

Signal $x_{cl}(t)$ provides timing information at a rate of one fourth the bit rate; this timing information is essential for sampling the integrator output in the demodulator (see FIG. 12). The basis signal set $\{s_1(t)\}$ required in the process of demodulation can be constructed easily by simple manipulation of the signals $x_{cl}(t)$ and $x_c(t)$. Recovery of $x_{cl}(t)$ and $x_c(t)$ from the received signal $s_{4psh}(t)$ has been illustrated in block diagram in FIG. 13.

CONSTANT ENVELOPE $Q^2PSK$

One can express the $Q^2PSK$ signal as follows:

$$s_{z2psk} = A(t)\cos(2\pi f_c t + \theta(t)) \tag{53}$$

where $\theta(t)$ is the carrier phase and $A(t)$ is the carrier amplitude given by:

$$A(t) = \left(2 + (a_1a_2 + a_3a_4)\sin\frac{\pi t}{T}\right)^{\frac{1}{2}} \tag{54}$$

Figure 14:
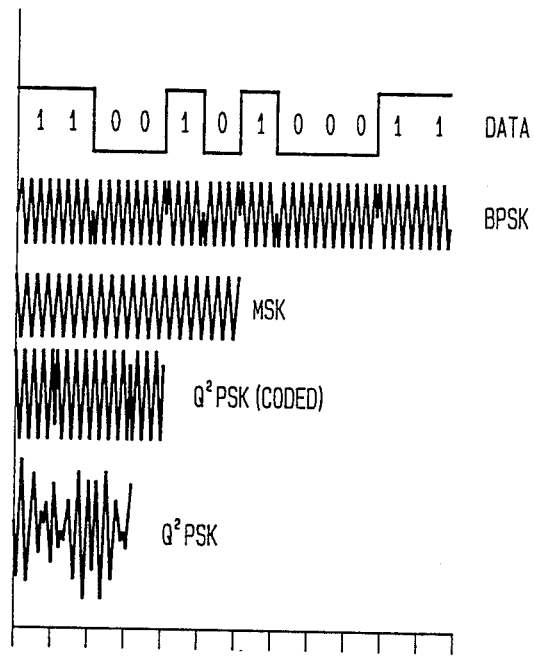
FIG. 14 is a representation of a plurality of waveforms referenced to a common time axis.

Without any additional constraint, the envelope of the $Q^2PSK$ signal is not constant; it varies with time. FIG. 14 is a representation of a plurality of waveforms referenced to a common time scale, and illustrates that $Q^2PSK$ has an envelope which varies in amplitude with time.

Although energy and bandwidth efficiencies are the two most significant criterion in the design of a modulation scheme. It is also very desirable to achieve a constant envelope as a feature of the system, particularly in certain nonlinear types of channels. For example, the travelling wave tube (TWT) amplifier of a satellite repeater usually converts amplitude variations into spurious phase modulation. A constant envelope of the transmitted signal would greatly reduce this problem.

In order to maintain a constant envelope let us consider a simple block codding at the input of the $Q^2PSK$ modulator: the coder accepts serial input binary data and for every three information bits $\{a_1,a_2,a_3\}$, it generates a codeword $\{a_1,a_2,a_3,a_4\}$ such that the first three bits in the code word are the information bits and the fourth one is an odd parity check for the information bits. The rate of the code is 3/4. One can write the parity check bit $a_4(t)$ as $$a_4(t) = -\frac{a_1(t)a_2(t)}{a_3(t)} \tag{55}$$

Substituting (55) into (54) one may observe that if this coded bit stream be modulated by $Q^2PSK$ format, a constant envelope is maintained. This additional envelope feature is achieved at the sacrifice of bandwidth efficiency; the information tramsmission rate is reduced from $R_b=2/T$ to $R_b=3/2T$.

Four of the eight possible code words $\{C_i\}^8_{i=1}$ are follows:

$C_1=(+++-)$ $C_2=(++-+)$ $C_3=(+-++)$ $C_4 = (+---)$

The remaining four code words are just the negatives of these. This is a set of eight biorthogonal codes with a minimum distance $d_{min}=2$. The code therefore can not be used for error correction. The redundant information associated with the fourth demultiplexed data stream $a_4(t)$ can be used to improve the signal to noise performance of the code.

Figure 15:
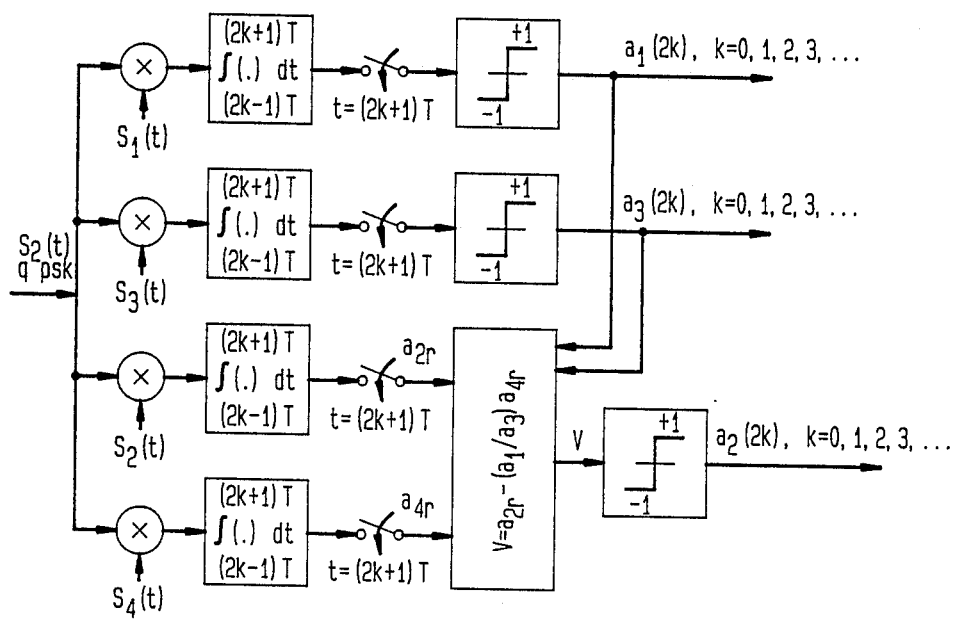
FIG. 15 is a block and line representation of a constant envelope Q²PSK demodulator system.

In practical situation when the signal is bandlimited, the biorthogonal structure of the code is destroyed due to intersymbol interference. In $Q^2PSK$ format there are two data shaping pulses: one is a smooth cosinusoid associated with data streams $a_1(t)$ and $a_3(t)$; the other is a half sinusoid with $a_2(t)$ and $a_4(t)$. On bandlimiting, the half sinusoid, because of its sharp discontinuities at the ends, gets relatively distorted. So we assume that, at the receiver, the redundant information associated with $a_4(t)$ is used only in making the binary decision about the information in $a_2(t)$; the decision about the information bits in $a_1(t)$ and $a_3(t)$ are made independently from the observations on the respective pulse trains only. A block diagram of the demodulator is shown in FIG. 15.

To make a decision about $a_2$, we make a simplifying assumption that $a_1$ and $a_3$ are decoded correctly. Correctly made decisions of $a_1$ and $a_3$ along with the estimates $a_{2r}$ of $a_2$ and its redundant version $a_{4r}$ of $a_4$ are then the observations for making decision about $a_2$. It can be shown that a sufficient statistic for making this decision is the random variable V, $$V = a_{2r} \frac{a_1}{a_3} a_{4r} \quad (56)$$

A decoder, which is optimum in the sense of minimizing the probability of error, will take a decision $a_2$ as $+1$ or $-1$ according as $V \geq 0$ or $V < 0$. In actual situation, however, formation of the right decision statistic (V) is subject to the correctness of the decision about $a_1$ and $a_3$. Let $p_1$ and $p_3$ be the probability of error in making decision about $a_1$ and $a_3$ and q be the probability of error in decision of $a_2$ when decision is based on correct decision statistic (V). Then one can show that the actual probability of error in $a_2$ is given by $$p_2 = q + p_1(1-p_1)(1-2q) \quad (57)$$

Figure 16:
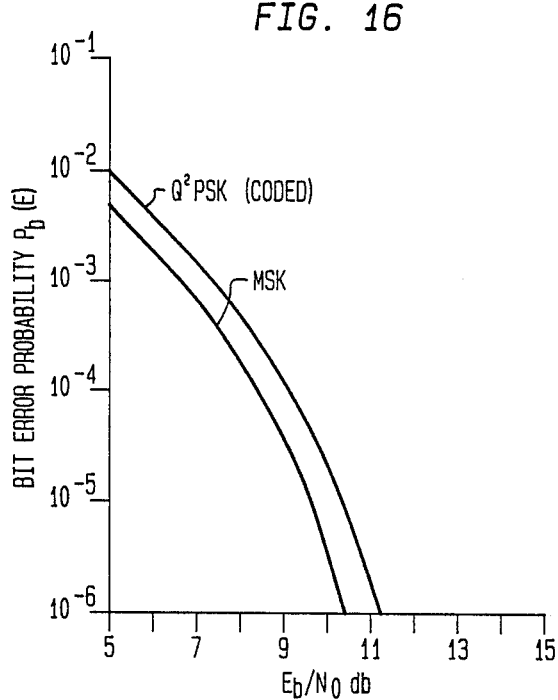
FIG. 16 is a graphical plot of bit error probability $P_b(E)$ versus $E_b/N_0$ for MSK and Q²PSK.

In evaluating the performance of the scheme, bandlimiting has been allowed at both receiver and transmitter through the use of sixth order Butterworth filters with half power bandwidth equal to $1.2/T = 0.8 \, R_b$. It has been found that for a bit error rate of $10^{-5}$, the constant envelope scheme requires an $E_b/N_0 = 10.3$ dB while that for MSK is $E_b/N_0 = 9.5$ dB. Thus there is 50% increase in the bandwidth efficiency over MSK at the cost of 0.8 dB increase in the average bit energy though both schemes have constant envelopes. Bit error probability of both MSK and the coded $Q^2PSK$ have been plotted against $E_b/N_0$ in FIG. 16.

The above evaluation of performance is based on the assumption of bit by bit detection. With symbol by symbol detection, one may utilize the distances among signals of coded $Q^2PSK$ (which are biorthogonal) more efficiently and make considerable improvement in energy efficiency. In absence of bandlimiting, with symbol by symbol detection the $E_b/N_0$ requirement of coded $Q^2PSK$ for a bit error rate of $10^{-5}$ is about 5.5 dB.

DEMODULATOR AND SYNCHRONIZATION SCHEME

Figure 17:
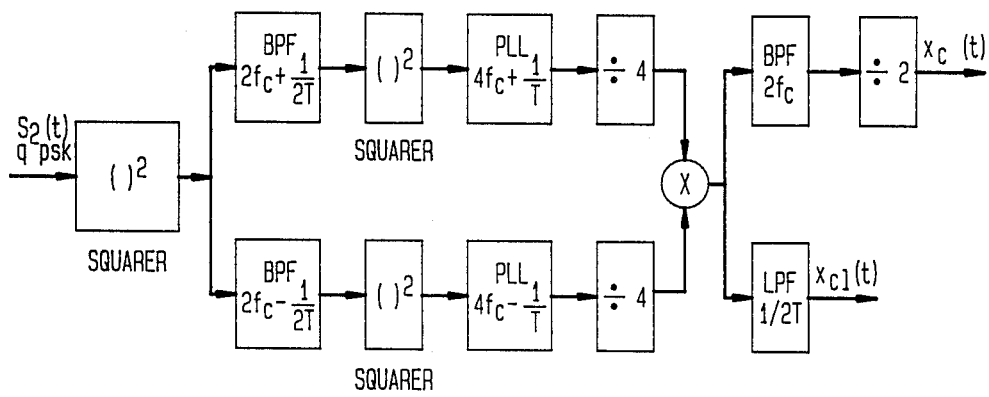
FIG. 17 is a block and line representation of a synchronization scheme for coherent demodulation of constant envelope Q²PSK signals.

A block diagram of the receiver which performs coherent demodulation of the coded $Q^2PSK$ signal is shown in FIG. 15. One of the basic problems in coherent demodulation is the recovery of the modulating signal phase and bit timing information from the received signal. In the present situation, we need to recover the basis signal set $\{s_1(t)\}$ and a clock signal at a rate of $\frac{1}{2}T$. These signals can be derived from the $Q^2PSK$ modulated signal by a nonlinear operation, such as squaring, and appropriate filtering in FIG. 17.

If the $Q^2PSK$ modulated signal defined by (53) passes through a squaring device, at the output we get, $$S^2_{q2psk}(t) = 1 + \tfrac{1}{2}(a_1a_2 + a_3a_4)\sin\left(\frac{\pi t}{T}\right) + \quad (58)$$

$$\tfrac{1}{2}(a_1a_2 - a_3a_4)\sin\left(\frac{\pi t}{T}\right)\cos(4\pi f_c t) +$$

$$\cos(\theta_{12} - \theta_{34})\sin(4\pi f_c t) +$$

$$\cos(\theta_{12} + \theta_{34})\cos\left(\frac{\pi t}{T}\right)\sin(4\pi f_c t) +$$

$$\sin(\theta_{12} + \theta_{34})\sin\left(\frac{\pi t}{T}\right)\sin(4\pi f_c t)$$

where, $$\theta_{12}(t) = \tan^{-1}\left(\frac{a_2(t)}{a_1(t)}\right) \quad (59a)$$

$$\theta_{34}(t) = \tan^{-1}\left(\frac{a_4(t)}{a_3(t)}\right) \quad (59b)$$

Substituting $a_4 = -a_1a_2/a_3$, one can simplify (58) as $$S^2_{q2psk}(t) = 1 + \tfrac{1}{2}(a_1a_3 + a_1a_2)\sin\left(2\pi t\left(2f_c + \frac{1}{2T}\right)\right) + \quad (60)$$

$$\tfrac{1}{2}(a_1a_3 - a_1a_2)\sin\left(2\pi t\left(2f_c - \frac{1}{2T}\right)\right)$$

There are two components on the right of (60) which carry the required clocking and carrier phase information. It can be shown that the expected value of each of these two components is zero. So the recovery of the clocking and the carrier phase information requires filtering and further nonlinear operation. By bandpass filtering of the squared signal one may construct two signals $x_1(t)$ and $x_2(t)$ as $$x_1(t) = \tfrac{1}{2}(a_1a_3 + a_1a_2)\sin\left(2\pi t\left(2f_c + \frac{1}{2T}\right)\right) \quad (61)$$

$$x_2(t) = \tfrac{1}{2}(a_1a_3 - a_1a_2)\sin\left(2\pi t\left(2f_c - \frac{1}{2T}\right)\right) \quad (62)$$

After sqaring $x_1(t)$, $x_2(t)$ and taking the expectation one can show $$E(x_1^2(t)) = \frac{1}{4}\left(1 - \cos 2\pi t\left(4f_c + \frac{1}{T}\right)\right) \quad (63)$$

$$E(x_2^2(t)) = \frac{1}{4}\left(1 - \cos 2\pi t\left(4f_c - \frac{1}{T}\right)\right) \quad (64)$$

Thus $x_1^2(t)$ and $x_2^2(t)$ contains spectral lines at $4f_c \pm 1/T$. One can use these lines to lock phase-locked loops, and carry out frequency divisions so as to form the signals $x_3(t)$ and $x_4(t)$ as $$x_3(t) = \cos 2\pi t\left(f_c + \frac{1}{4T}\right) \quad (65)$$

$$x_4(t) = \cos 2\pi t\left(f_c - \frac{1}{4T}\right) \quad (66)$$

A multiplication of these two signals followed by bandpass filtering and frequency division gives clocking and carrier phase information as $$x_{cl}(t) = \cos\frac{\pi t}{T} \quad (67)$$

and $$x_c(t) = \cos 2\pi f_c t \quad (68)$$

Signal $x_{cl}(t)$ provides timing information at a rate of $\frac{1}{2}T$; this timing information is essential for sampling the integrator output in the demodulator (see FIG. 15). The basis signal set $\{s_i(t)\}$ required in the process of demodulation can be constructed easily by simple manipulation of the signals $x_{cl}(t)$ and $x_c(t)$.

III. Pulse Shaping

Original Q²PSK used a half cosinusoid and a half sinusoid [defined as $p_1(t)$ and $p_2(t)$ in 2(a) and 2(b)] as two data shaping pulses. It is observed that in achieving twice the bandwidth efficiency of minimum shift keying, the original Q²PSK requires about forty five percent increase in the average bit energy which is mostly due to intersymbol interference caused by the bandlimiting effect on the data shaping pulse $p_2(t)$. With the ninety nine percent power bandwidth of MSK as the definition of channel bandwidth, a data pulse of the shape $p_1(t)$ gets through almost undistorted; but a data pulse of the shape $p_2(t)$ is seriously distorted because of the sharp discontinuities in $p_2(t)$ at $t = \pm T$. It is also observed that if three or more pulses of the shape $p_2(t)$ occur in a row with the same polarity then bandlimiting causes a destructive interference of worst kind. This worst case situation of interference is primarily responsible for the requirement of higher bit energy. In an attempt to improve the energy efficiency, one way to reduce the intersymbol interference is to apply proper waveshaping to the data pulses. In other words, one needs to find out suitable shapes $p_1(t)$ and $p_2(t)$ so that their effect of intersymbol interference due to bandlimiting is either eliminated completely or reduced greatly.

Figure 18:
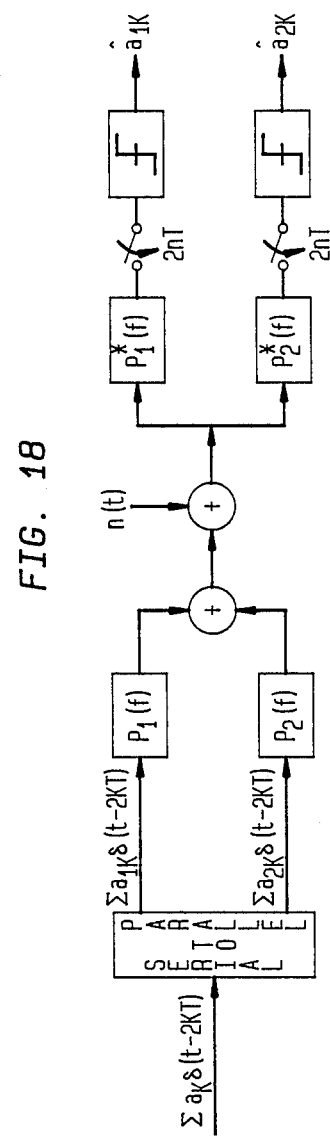
FIG. 18 is a block and line representation of a baseband model for a transmitter and receiver.

In this section we look into Q²PSK transmission in baseband domain. Baseband model of transmitter and receiver is illustrated in FIG. 18. In actual situation, however, two such blocks of transmitter and receiver are present; one is associated with the sine carrier, the other is with the cosine carrier. In this model the input binary data stream has been represented by a series of impules occurring at intervals of T sec. The amplitude factor $a_k$ can be either $+1$ or $-1$. The input stream is demultiplexed into two streams; the rate of impulses in the demultiplexed streams is half of the rate (1/T) in the incoming stream. $P_1(f)$ and $P_2(f)$ are the pair of transmitter filters; $P_1^*(f)$ and $P_2^*(f)$ are the corresponding matched filters at the receiver. The receiver and transmitter filters occupy a common bandwidth $(-W, W)$, where W is the one sided bandwidth. In absence of noise $n(t)$, the signal at the input of receiver is given by, $$\delta_{q2psk}(t) = \quad (69)$$

$$\sum_{k=-\infty}^{\infty} (a_{1,k}p_1(t - 2kT) + a_{2,k}p_2(t - 2kT)) \quad -T < t < T$$

where $p_1(t)$ and $p_2(t)$ are the impulse responses of the transmitter filters which are not necessarily (unlike original Q²PSK data pulses) time limited and $a_{l,k}$'s being either $+1$ or $-1$ represent the demultiplexed information bits over the interval $(k-1)T < t < (k+1)T$.

Suppose the two observation bits are $a_{1,0}$ and $a_{2,0}$. At the receiver the matched filter outputs are sampled at regular intervals of 2T and binary decisions are taken using a zero crossing detector. The sampled values at the output of the two matched filters represent the coordinates of the baseband signal in a two dimensional signal space where $p_1(t)$ and $p_2(t)$ serve as the bases. The coordinate values are given by $$x_{10} = a_{1,0}R_{11}(0) + \sum_{n \neq 0} a_{1,n}R_{11}(n) + \sum_n a_{2,n}R_{21}(n) \quad (70)$$

$$x_{20} = a_{2,0}R_{22}(0) + \sum_{n \neq 0} a_{2,n}R_{22}(n) + \sum_n a_{1,n}R_{12}(n) \quad (71)$$

where, $$R_{11}(n) = R_{11}(2nT) = \int_{-T}^{T} p_1(t - 2nT)p_1(t)dt \quad (72)$$

$$R_{22}(n) = R_{22}(2nT) = \int_{-T}^{T} p_2(t - 2nT)p_2(t)dt \quad (73)$$

$$R_{12}(n) = R_{12}(2nT) = \int_{-T}^{T} p_1(t - 2nT)p_2(t)dt \quad (74)$$

$$R_{21}(n) = R_{21}(2nT) = \int_{-T}^{T} p_2(t - 2nT)p_1(t)dt \quad (75)$$

are the sampled values of the auto and cross-correlation function of the pulses $p_1(t)$ and $p_2(t)$. The first term on the right of (70) or (71) is the desired one; the remaining two summation terms are due to intersymbol interference. It is to be noted that $p_1(t)$ and $p_2(t)$, in general, are not timelimited; so both stream of pulses are causing intersymbol interference. To eliminate the effect of ISI in the process of making binary decisions one needs the following criterion $$R_{11}(n) = R_{22}(n) = \delta_{no} \tag{76a}$$

$$R_{12}(n) = R_{21}(n) = 0 \tag{76b}$$

where, $$\delta_{n0} = 1 \quad n = 0$$
$$= 0 \quad n \neq 0$$

It should be observed that the above set of criterion imposes much stronger restrictions on the shape of the two data pulses than mere simple orthogonality between them. The auto and cross-correlation functions are related to the power spectra by the following relations.

$$R_{11}(n) = \int_{-\infty}^{\infty} P_1'(f) P_1(f) e^{j4n\pi fT} df \tag{77}$$

$$R_{ij}(n) = \int_{-\infty}^{\infty} P_1'(f) P_1(f) e^{j4n\pi fT} df \tag{78}$$

where, $$i,j = 1,2; i \neq j$$

Now, $R_{ii}(k)$ can be written in the following form $$R_{11}(n) = \sum_k \int_{\frac{2k-1}{4T}}^{\frac{2k+1}{4T}} P_{1b}'(f) P_1(f) e^{j4n\pi fT} df \tag{79}$$

A change of variables and an interchange of summation and integration gives $$R_{11}(n) = \int_{-\frac{1}{4T}}^{\frac{1}{4T}} S_{eqb}^1(f) e^{j4n\pi fT} df = \delta_{n0} \tag{80}$$

where, $$S_{eq}^1(f) = \sum_k \left| P_1\left(f + \frac{k}{2T}\right) \right|^2, |f| \leq \frac{1}{4T} \tag{81}$$
$$= 0, |f| > \frac{1}{4T}$$

is the equivalent wrapped version of the bandlimited power spectrum of the $i^{th}$ pulse $p_i(t)$. Similarly eq. (76b) can be written as $$R_{ij}(n) = \int_{-\frac{1}{4T}}^{\frac{1}{4T}} S_{eq}^{1j}(f) e^{j4n\pi fT} df = 0 \tag{82}$$

where, $$S_{eq}^{ij}(f) = \sum_k P_i'\left(f + \frac{k}{2T}\right) P_j\left(f + \frac{k}{2T}\right), |f| \leq \frac{1}{4T} \tag{83}$$
$$= 0, |f| > \frac{1}{4T}$$

is the equivalent wrapped version of the bandlimited cross power spectrum of the pulses $p_i(t)$ and $p_j(t)$. The equivalent wrapped version is constructed by slicing the original spectrum into segments of width $\frac{1}{2}T$ and superimposing all the segments on the interval $[-\frac{1}{4}T, \frac{1}{4}T]$.

In an attempt to improve the energy efficiency of $Q^2PSK$, we, therefore, frame the following guidelines to study the scope of waveshaping in reducing the effect of ISI:

Chosse $P_i(f), i = 1, 2$ such that $$\int_{-\frac{1}{4T}}^{\frac{1}{4T}} S_{eq}^i(f) e^{j4n\pi fT} df = \delta_{n0} \tag{84a}$$

and $$\int_{-\frac{1}{4T}}^{\frac{1}{4T}} S_{eq}^{ij}(f) e^{j4n\pi fT} df = 0 \tag{84b}$$

$$i,j = 1,2;$$
$$i \neq j$$

are satisfied for complete elimination of ISI or the above two integrals are minimized so that the effect of ISI is minimized in the sense of minimizing the probability of error.

Figure 19A:
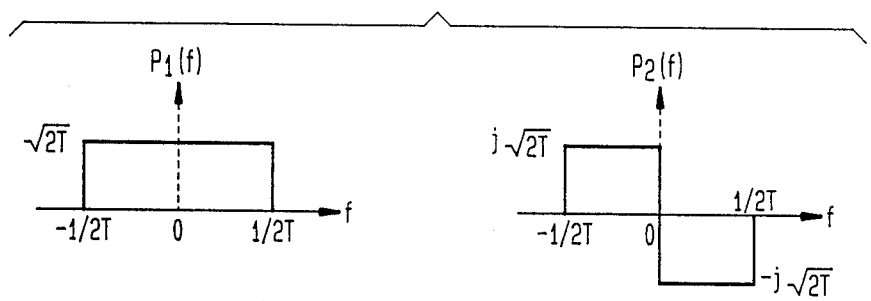
FIGS. 19A, 19B, and 19C are graphical plots of waveforms as respective transmitter filter pairs for Q²PSK transmission with zero intersymbol interference in a bandlimited environment.
Figure 19B:
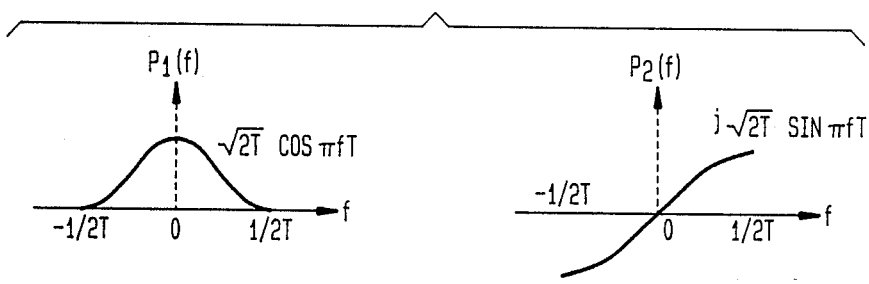
Figure 19C:
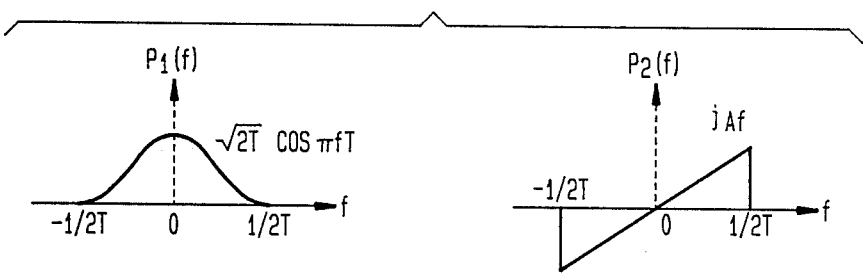

There are infinite number of solutions for $P_1(f)$ and $P_2(f)$ which satisfy (84a) (84b). A few of them are illustrated in FIGS. 19A, 19B, and 19C. From the realization point of view the solution illustrated in FIG. 19C is specially convenient; one of the two filters has a raised cosine shape $P_1(f)$ with 100% roll-off (i.e. 100% excess bandwidth), the other is $P_2(f)$ which is just a bandlimited differentiator. With this pair of filter shapes, the bandwidth efficiency is 2 bits/sec/hertz which is considerably higher than the bandwidth efficiency 1.66 of original $Q^2PSK$. The energy efficiency is also improved from original value of 11.2 dB to 9.6 dB in present situation. But it should be noted that $P_2(f)$ has a realization problem due to the sharp cut off at $f = \pm 1/2T$.

Figure 20:
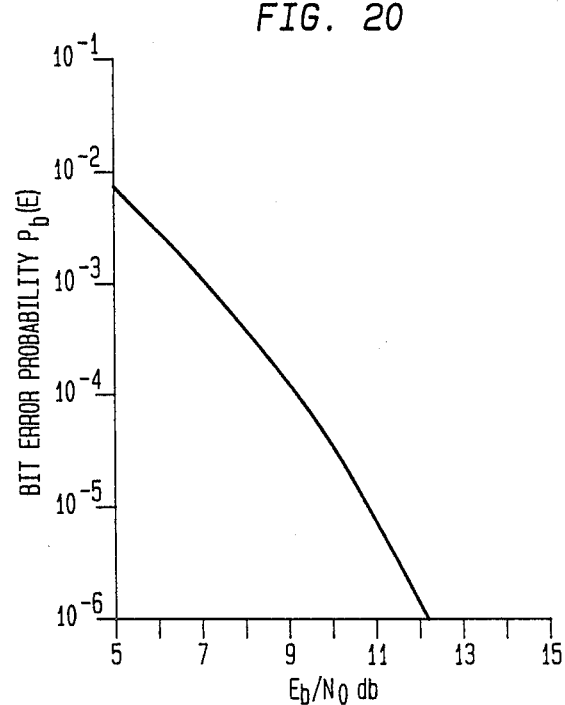
FIG. 20 is a graphical plot of bit error probability as a function of $E_b/N_0$ for Q²PSK transmission using the transmitter filter pairs of FIGS. 19A, 19B, and 19C.

However, instead of sharp cut off filtering at $f = \pm 1/2T$ if one allows a Butterworth filtering alongwith an ideal differentiator, the realization problem is greatly reduced. FIG. 20 shows the bit error probability performance with $P_1(f) = \sqrt{2T} \cos \pi fT$ and $P_2(f) = fB(f)$, where $B(f)$ is a Butterworth filter of second order with three dB bandwidth as $W = 0.5 R_b$. The corresponding bandwidth efficiency is 2 bits/sec/Hertz and the bit energy requirement for a bit error rate of $10^{-5}$ is 10.8 dB. Thus pulse shaping provides considerable improvement in both energy and bandwidth efficiencies over the original $Q^2PSK$.

IV. Generalized Quadrature-Quadrature Phase Shift Keying

Let $\{p_1(t)\}_{l=1}^n$ be a set of n data shaping components, which, along with two orthogonal carriers of frequency $f_c$, are used to modulate 2n IID binary data streams $\{a_i(t)\}^n_{i=1}$ and $\{b_i(t)\}^n_{i=1}$ such that the modulated signal is given by, $$s(t) = \sum_{i=1}^{n} a_i(t)p_i(t)\cos 2\pi f_c t + \sum_{i=1}^{n} b_i(t)p_i(t)\sin 2\pi f_c t \quad (85)$$

where, $$\int_{(2k-1)T/2}^{(2k+1)T/2} p_i(t)p_j(t)dt = \delta_{ij} \quad (86)$$

Each binary data ($\pm 1$) in $a_i(t)$ and $b_i(t)$ is of duration T; e.g. the k th data in any of the 2n streams appears over $(2k-1)T/2$ to $(2k+1)T/2$. The modulated signal space will be the vertices of a hypercube of dimension 2n. The overall bit rate of the system is $R_b=2n/T$. Signal s(t) represents a generalized Q²PSK signal. The special case of n=1 is a two dimensional scheme such as QPSK, MSK or QORC [Appendix A]. In the first section we considered the special cases of n=2 which is the original Q²PSK Phase and spectral properties of Q²PSK(n=2)

One can write Q²PSK(n=2) signal as $$s_{q2psk}(t) = A(t)\cos[2\pi f_c t + \theta(t)] \quad (87)$$

where, $$A(t) = \left(2 + (a_1 a_2 + a_3 a_4)\sin\frac{2\pi t}{T}\right)^{\frac{1}{2}} \quad (88a)$$

and $$\theta(t) = \tan^{-1}\left(-\frac{a_3\cos\frac{\pi t}{T} + a_4\sin\frac{\pi t}{T}}{a_1\cos\frac{\pi t}{T} + a_2\sin\frac{\pi t}{T}}\right) \quad (88b)$$

Symbol transitions occur at the instants $t=(2n+1)T/2$, where n is an integer; at those instants carrier phase $\theta(t)$ can be any one of the four possible values $\pm 45°$, $\pm 135°$. Thus an abrupt $\pm 90°$ or $180°$ phase change in the RF carrier will occur at every symbol transition instant. Thus the modulated signal doesn't maintain continuity in phase. In designing a modulation scheme, though energy and bandwidth efficiencies are the two most important criterion, continuity of phase in the RF signal may be an additional desirable feature in certain situations. With continuity in phase, high frequency content and therefore secondary sidelobes can be expected to be relatively lower in strength; in other words, spectral fall-off will be sharper and so restrictions on the subsequent bandlimiting filter shapes can be relaxed. This is desirable in certains situations where filtering after modulation is cost prohibitive and out of band radiation needs to be at low level. Also in bandlimited situation, faster spectral fall-off of the signal itself may result in less ISI and hence less average bit energy requirement for specified bit error rate. So it is quite reasonable to look for possibilities of bringing continuity of phase in the Q²PSK signal. In order to bring phase continuity, we look at the Q²PSK signal in a six dimensional signal space.

Q²PSK (n=3)

In general, the Q²PSK signal can be written as $$s(t) = A(t)\cos[2\pi f_c t + \theta(t)] \quad (89)$$

where A(t) is the amplitude of the modulated carrier and $\theta(t)$ is the phase given by $$\theta(t) = \tan^{-1}\left(\frac{\sum_{i=1}^{n} b_i(t)p_i(t)}{\sum_{i=1}^{n} a_i(t)p_i(t)}\right) \quad (90)$$

We assume the data shaping components $p_i(t)$ are continuous for all t and the modulated signal maintains continuity in phase at every symbol transition instant; this is desirable for faster asymptotic fall off in the spectral density of the modulated signal. This condition is satisified if $$p_i[(2k+1)T/2]=0 \text{ for all } k \quad (91)$$

Figure 21:
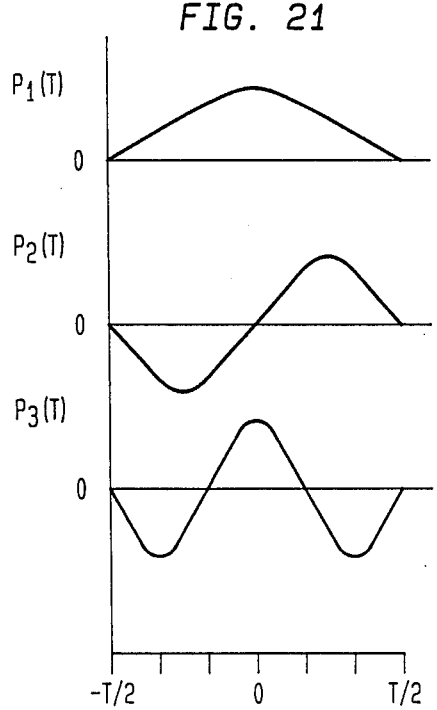
FIG. 21 is a graphical representation of truncated Sinc function data shaping components for Q²PSK (n=3)

The minimum bandwidth solution for $p_i(t)$ is a sinc function which occupies a bandwidth of $|f|\leq 1/T$. But the minimum bandwidth solution being unique, one can't have more than one $p_i(t)$ which maintains orthogonality (86) and occupy the same minimum bandwidth $|f|\leq 1/T$ at the same time. So we looked for a different (nonoptimum) set of pulse shaping components and compared their spectral efficiencies. One choice is a truncated sinc function given by $$x(t;T) = A\frac{\sin(2\pi t/T)}{2\pi t/T} \quad |t|\leq \frac{T}{2} \quad (92)$$

$$= 0 \quad |t| > \frac{T}{2}$$

where A=1.0518 is a normalizing constant to make x(t;T) a unit energy pulse. In order to maintain orthogonality among the data shaping components we constructed the set $\{p_i(t)\}$ as follows:

$$p_1(t)=x(t;T) \quad (93a)$$

$$p_2(t)=[D_2^1-D_2^{-1}]x(t;T/2) \quad (93b)$$

$$p_3(t)=[-D_3^1+1-D_3^{-1}]x(t;T/3) \quad (93c)$$

$$p_{n-1}(t) = \sum_{k=1}^{m}((-1)^k D_n^{-k} + (-1)^{(k-1)}D_n^k)x(t;T/n) \quad (93n-1)$$

$$p_n(t) = \sum_{k=-m}^{m}(-1)^k D_n^{-k}x(t;T/n) \quad (93n)$$

where n=2m+1 and the operator $D_j^k$ represents a delay of kT/j units of time. The construction of this set of data shaping components is illustrated in FIG. 21.

Generation of sophisticated data pulse at high frequency (such as a truncated sinc pulse at several GHz) may become very expensive. So other choices of data shaping components which are less expensive are worth mentioning. We consider the following set of three signals as an example $$p_1(t) = \frac{2}{\sqrt{T}} \cos(\pi t/T)\cos(2\pi t/T) \quad (94a)$$

$$p_2(t) = \frac{2}{\sqrt{T}} \sin(\pi t/T)\sin(2\pi t/T) \quad (94b)$$

$$p_3(t) = \frac{2}{\sqrt{T}} \cos(\pi t/T)\sin(2\pi t/T) \quad (94c)$$

This set of data shaping components satisfy both orthogonal and zero crossing condition given by (86) and (91). Each of these signals can be expressed as sum or difference of two signals of frequencies $f_1 = \frac{1}{2}T$ and $f_2 = 3/2T$, so we call (93) composite waveforms.

The difference between the two frequencies is $1/T$; this is exactly twice the minimum spacing ($\frac{1}{2}T$) that one needs for coherent orthogonality of two FSK signals of duration T. So there must be another set of three signals with frequences $f_1$, $f_2$, $f_3$ such that the difference between adjacent consecutive frequencies is the minimum spacing needed for minimum shift keying. This set is given by $$p_1(t) = \sqrt{\frac{2}{T}} \cos(\pi t/T) \quad (95a)$$

$$p_2(t) = \sqrt{\frac{2}{T}} \sin(2\pi t/T) \quad (95b)$$

$$p_3(t) = \sqrt{\frac{2}{T}} \cos(3\pi t/T) \quad (95c)$$

We call (95) simple wave forms. The set constructed from truncated sinc function becomes identical to this set of simple wave forms if one redefines $x(t;T)$ in (92) as $\cos(\pi t/T)$. The effect of modulating this set of simple data shaping components by orthogonal carriers is to translate the spectrum of a set of minimum shift keying type signals (which is different from the well known MSK scheme) from baseband to a bandpass region. This is the basic difference between quadrature-quadrature phase shift keying and minimum shift keying which enables Q$^2$PSK to use a given bandwidth more efficiently in the bandpass region.

Next we will discuss the spectral properties of Q$^2$PSK schemes which utilize the set of truncated sinc pulses, composite waveforms and simple waveforms as the baseband data shaping components. Among these three sets of data shaping components, particularly the last two are favourably from an implementation view point; this is because they could be constructed by simple addition and subtraction of sinusoids which can be generated with perfection even at several GHz frequency.

Spectral Density

The equivalent normalized baseband power spectral density of generalized Q$^2$PSK signal is given by, $$S_{q2psk}(f) = \frac{1}{n} \sum_{i=1}^{n} |P_i(f)|^2 \quad (96)$$

where $P_i(f)$ is the Fourier transform of the $i^{th}$ data shaping pulse $p_i(t)$ and $$\int_{-\infty}^{\infty} S_{q2psk}(f) df = 1$$

Simple Wave Shape

The baseband data shaping components over $|t| \leq T/2$ are given by (95); the corresponding Fourier transforms are $$P_1(f) = \frac{2\sqrt{2T}}{\pi} \left( \frac{\cos \pi fT}{1 - 4f^2T^2} \right) \quad (97a)$$

$$P_2(f) = -j \frac{\sqrt{2T}}{\pi} \left( \frac{\sin \pi fT}{1 - f^2T^2} \right) \quad (97b)$$

$$P_3(f) = -6 \frac{\sqrt{2T}}{\pi} \left( \frac{\cos \pi fT}{9 - 4f^2T^2} \right) \quad (97c)$$

Hence the spectral density is given by $$S^s_{q2psk}(f) = \quad (98)$$

$$\frac{T}{3\pi^2} \left( \frac{8\cos^2 \pi fT}{(1 - 4f^2T^2)^2} + \frac{72\cos^2 \pi fT}{(9 - 4f^2T^2)^2} + \frac{2\sin^2 \pi fT}{(1 - f^2T^2)^2} \right)$$

where the additional superscript s stands to mean simple wave shaping.

Composite Wave Shape

The baseband data shaping components over $|t| \leq T/2$ are given by (94); the corresponding Fourier transforms are given by $$P_1(f) = \frac{2\sqrt{T}}{\pi} \cos \pi fT \left( \frac{1}{1 - 4f^2T^2} - \frac{3}{9 - 4f^2T^2} \right) \quad (99a)$$

$$P_2(f) = \frac{2\sqrt{T}}{\pi} \cos \pi fT \left( \frac{1}{1 - 4f^2T^2} + \frac{3}{9 - 4f^2T^2} \right) \quad (99b)$$

$$P_3(f) = j \frac{2\sqrt{T}}{\pi} \cos \pi fT \left( \frac{2fT}{9 - 4f^2T^2} - \frac{2fT}{1 - 4f^2T^2} \right) \quad (99c)$$

Hence the spectral density is given by $$S^c_{q2psk}(f) = \frac{8T}{3\pi^2} \cos^2 \pi fT \left( \frac{1 + 2f^2T^2}{(1 - 4f^2T^2)^2} + \frac{9 + 2f^2T^2}{(9 - 4f^2T^2)^2} + \frac{4f^2T^2}{(9 - 4f^2T^2)(1 - 4f^2T^2)} \right) \quad (100)$$

where the additional superscript c stands to mean composite wave shaping.

Truncated Sinc Function Wave Shape

The data shaping components are given by (93); we consider only the first three components to form a six dimensional signal space. There is no closed form expression for the spectral density; results due to numerical calculation are illustrated in FIG. 22 and FIG. 23.

Figure 22A:
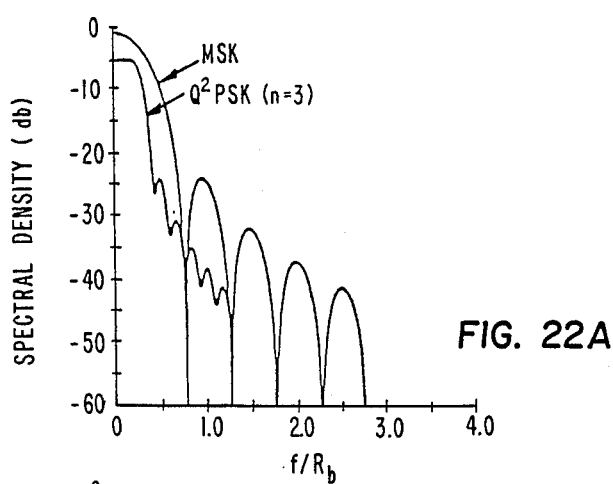
FIGS. 22A, 22B, and 22C are graphical plots comparing the spectral densities of MSK and Q²PSK using simple, composite, and truncated Sinc function waveshapes, respectively.
Figure 22B:
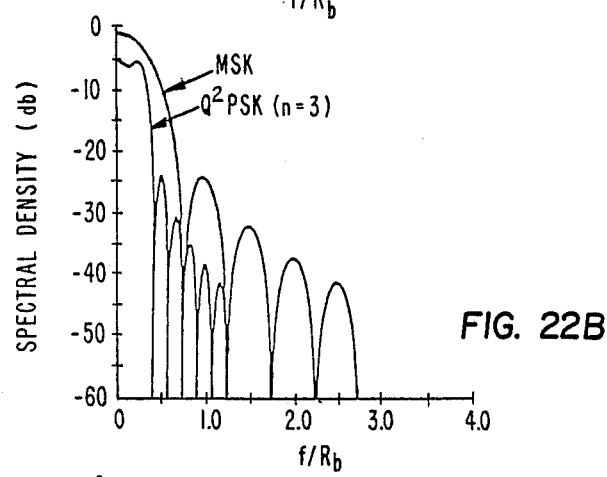
Figure 22C:
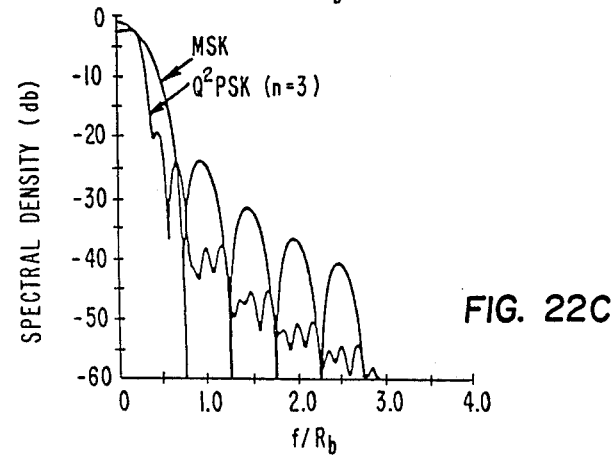

FIG. 22 shows the spectral densities of MSK and three continuous phase Q²PSK cases, spectral densities have been plotted against normalized frequency $f/R_b$, where $R_b$ is the bit rate associated with respective schemes. It should be noted that the spectral fall-off associated with all three generalized Q²PSK schemes, each of which maintains continuity in phase, is much faster than that associated with MSK, although MSK also maintains a continuity in the carrier phase. Among three generalized Q²PSK schemes, simple and composite wave shaping exhibit almost identical spectral density (except a few nulls in the composite case) which fall off somewhat faster than that of truncated sinc waveshaping. But a mere looking into the spectral densities doesn't give any quantitative information about spectral compactness and energy efficiencies of the schemes.

Figure 23:
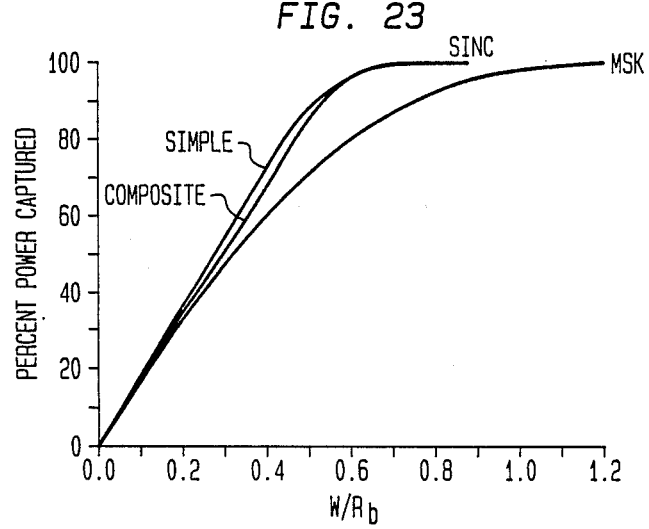
FIG. 23 is a plot of percent power captured as a function of normalized bandwidth for MSK and Q²PSK (n=3) using Sinc, simple, and composite waveshaping.

A measure of spectral compactness is the percent of total power captured in a specified bandwidth; this is plotted in FIG. 23 for all four schemes, where W represents one sided bandwidth around the carrier frequency. We consider ninety nine percent power bandwidth as the inverse measure of spectral compactness. FIG. 23 shows that both simple and composite waveshaping reaches quickly to the ninety nine percent value at $W=0.75R_b$ and at $W=0.725R_b$ respectively; whereas truncated sinc waveshaping and MSK reaches that value at $W=0.9R_b$ and $W=1.2R_b$. Therefore in an increasing order of spectral compactness, the four schemes come in the following order: MSK, Q²PSK(n=3): Truncated Sinc Wave Shape, Simple and Composite Wave Shape; the corresponding bandwidth efficiencies, defined to be the ratio of bit rate to bandwidth, are 0.83, 1.1, 1.33 and 1.38 respectively. Thus with composite waveshaping it is possible to achieve a bandwidth efficiency which is 1.65 times that of MSK. It should be remembered that Q²PSK (n=2) increases the bandwidth efficiency by a factor of two over MSK. In applications where bandwidth efficiency is of primary concern and Q²PSK (n=2) seems to be a better candidate; but where use of fine filtering (bandlimiting) is cost prohibitive or symbol switching is desirable at zero amplitude level, Q²PSK(n=3) may find a suitable position.

Figure 24:
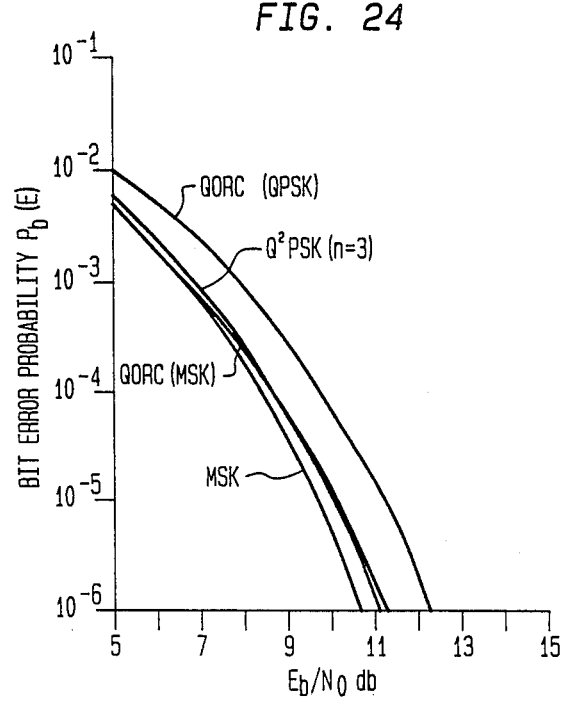
FIG. 24 is a plot of bit error probability $P_b(E)$ as a function of $E_b/N_0$ for Q²PSK (simple wave shaping), MSK, and QORC.

If transmission is allowed over 99% power bandwidth of respective modulation schemes, one may reasonably assume that there will be no noticeable intersymbol interference and the hypercube geometry of the signal will virtually remain unchanged. Hence for Q²PSK(n=3) schemes with bandwidth equal to $0.725R_b$ and $0.75R_b$ respectively for composite and simple waveshaping, the average bit energy requirement $(E_b/N_0)$ is 9.6 db. One may summarize all the results in the following table.

that of Q²PSK as $f^{-4}$, the latter scheme outperforms the former in bandwidth efficiency. Bit error probability of Q²PSK (simple), MSK and QORC are plotted in FIG. 24 as function of $E_b/N_0$. This result is based on bandlimiting using sixth order Butterworth filter with half power bandwidth as: $W=R_b$ for both MSK and QORC, $W=2/3R_b$ for Q²PSK. Two different receivers have been considered for QORC (ref. to Appendix A): one is MSK, the other is QPSK. It is observed that the performances of Q²PSK and QORC with the MSK receiver are almost identical; while energy efficiency (ie $E_b/N_0$ for a $P_b(E)=10^{-5}$) of MSK is slightly better by 0.4 db. However, Q²PSK transmits fifty percent more data than QORC and MSK.

Appendix A

Two Dimensional Schemes: QPSK, MSK, QORC

A two dimensional modulated signal can be represented by (85) with n=1; it is given by $$s(t)=a_1(t)p_1(t)\cos 2\pi f_c t + b_1(t)p_1(t)\sin 2\pi f_c t \quad (A1)$$

For QPSK, $$p_1(t) = q(t) = \frac{1}{\sqrt{T}} \quad |t| \leq \frac{T}{2} \quad (A2)$$

$$= 0 \quad |t| > \frac{T}{2}$$

For MSK (except for a relative offset of T/2), $$p_1(t) = m(t) = \sqrt{\frac{2}{T}} \cos\left[\frac{\pi t}{T}\right] \quad |t| \leq \frac{T}{2} \quad (A3)$$

$$= 0 \quad |t| > \frac{T}{2}$$

Both QPSK and MSK are constant envelope modulation schemes; their spectral densities fall off as $f^{-2}$ and $f^{-4}$ respectively. A third kind of two dimensional non constant envelope scheme can be described by a pulse shaping component as $$p_1(t) = h(t) = Aq(t + T/2) * m(t + T/2) \quad (A4)$$

$$= \frac{1}{\sqrt{3T}}\left[1 + \cos\frac{\pi t}{T}\right] \quad |t| \leq T$$

$$= 0 \quad |t| > T$$

Where A is a constant and * denotes time convolution. Here h(t) represents a raised cosine pulse which extends from $-T$ to $+T$ and therefore causes overlapping with the adjacent pulses on either side; hence the name is Quadrature Overlapped Raised Cosine (QORC)

TABLE I

| Type of modulation | MSK biorthogonal | Q²PSK(n = 3) trun.sinc | Q²PSK(n = 3) simple | Q²PSK(n = 3) composite | Q²PSK n = 2 |
|---|---|---|---|---|---|
| Bit Rate = $R_b$ | | | | | |
| Bandwidth efficiency | .83 | 1.11 | 1.33 | 1.38 | 1.66 |
| $E_b/N_0$ for $P_b(E) = 10^{-5}$ | 9.6 dB | 9.6 dB | 9.6 dB | 9.6 dB | 11.2 dB |

Q²PSK performance has also been compared with that of QORC, another non constant envelope scheme. Though spectral density of QORC falls off as $f^{-6}$, while scheme. It spectral density is the product of QPSK and MSK spectral densities and therefore fall off as $f^{-6}$. The spectral density is given by $$S_{qorc}(f) = \frac{T}{3}\left(\frac{\sin 2\pi fT}{\pi fT(1 - 4f^2T^2)}\right)^2 \quad (A5)$$

In addition to $f^{-6}$ spectral fall off, QORC retains the same first null as QPSK (the first null of MSK is at 1.5 times that of QPSK). QORC is more spectrally compact than MSK and QPSK, but it doesn't maintain constant envelope. Because of overlapping of the adjacent pulses, matched filter detection is not optimum; detections with QPSK or MSK demodulators are two possibilities. In spite of its non constant envelope, QORC has been reported to outperform MSK in certain nonlinear channels.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. A modulation method for modulating simultaneously four streams of data pulses, the modulation method comprising the steps of:

coding each of the four streams of data pulses into a respectively associated stream of data words, each such data word being formed of a predetermined number of the data pulses from the associated one of the data pulse streams, and a parity check bit, said parity check bit having a value responsive to a mathematical operation performed using said predetermined number of the data pulses;

combining a pulse-shaping signal with respective ones of first and second carrier signal components, each of said first and second carrier signal components having the same frequency as the other and a quadrature phase relationship with respect to the other, to produce first and second composite modulation signals, each having first and second frequency components;

combining subtractively said first and second frequency components associated with each of said first and second composite modulation signals, to produce first and third modulation signals;

combining additively said second and first frequency components associated with each of said first and second composite modulation signals, to produce second and fourth modulation signals; and combining said first, second, third, and fourth modulation signals with respective ones of said four streams of said data words, to produce respectively corresponding first, second, third, and fourth modulated streams of pulses having predetermined pulse shapes and quadrature pulse phase relationships with respect to one another, combining said first, second, third, and fourth modulated streams of pulses, whereby a transmission signal formed of the combination of said first, second, third, and fourth modulated streams of pulses has a constant envelope.

2. The method of claim 1 wherein each of said data words is formed of three data pulses, $a_1$, $a_2$, and $a_3$, and said parity check bit, $a_4$, where:

$$a_4(t) = -\frac{a_1(t)a_2(t)}{a_3(t)}$$

* * * * *